US012346538B2

(12) United States Patent
McCue et al.

(10) Patent No.: US 12,346,538 B2
(45) Date of Patent: *Jul. 1, 2025

(54) CONFIGURING SUBSCRIPTIONS FOR OBJECTS OF THIRD-PARTY APPLICATIONS INTEGRATED INTO A COMMUNICATION PLATFORM

(71) Applicant: Salesforce, Inc., San Francisco, CA (US)

(72) Inventors: Lorilyn McCue, Pacifica, CA (US); Kimberly Munoz, Oakland, CA (US); Zachariah Buechler, Portland, OR (US); Sai Pinapati, Foster City, CA (US); Michael Deng, San Francisco, CA (US); Albert Treat, Kirkland, WA (US); Ryan Mah, Santa Clara, CA (US); Saurabh Sahni, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 59 days.

This patent is subject to a terminal disclaimer.

(21) Appl. No.: 18/186,479

(22) Filed: Mar. 20, 2023

(65) Prior Publication Data

US 2023/0229291 A1 Jul. 20, 2023

Related U.S. Application Data

(63) Continuation of application No. 17/163,095, filed on Jan. 29, 2021, now Pat. No. 11,609,686, which is a (Continued)

(51) Int. Cl.
*G06F 9/54* (2006.01)
*G06F 3/0481* (2022.01)
(Continued)

(52) U.S. Cl.
CPC .......... *G06F 3/0484* (2013.01); *G06F 3/0481* (2013.01); *G06F 3/0482* (2013.01);
(Continued)

(58) Field of Classification Search
CPC .... G06F 3/0484; G06F 3/0481; G06F 3/0482; G06F 9/542; G06F 40/30; G06N 20/00; H04L 65/403; H04L 67/306; G06Q 10/103
See application file for complete search history.

(56) References Cited

U.S. PATENT DOCUMENTS 7,904,923 B2 * 3/2011 Putterman ............. H04L 67/567
725/50
2008/0301250 A1 12/2008 Hardy et al.
(Continued)

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

(Continued)

Primary Examiner — K C Chen
(74) Attorney, Agent, or Firm — Lee & Hayes, P.C.

(57) ABSTRACT

Configuring subscriptions for receiving notifications associated with objects of a group-based communication platform is described. A user interface element, which can correspond to an object, can be displayed in a user interface of the group-based communication platform. An indication of an interaction with the user interface element can be received and in response to receiving the indication of the interaction with the user interface element, a subscription user interface can be presented via the user interface, wherein the subscription user interface is associated with an
(Continued)

option to subscribe to notifications associated with the object. In response to receiving a request to subscribe to notifications associated with the object, a subscription for notifications associated with the object can be generated and, in response to generating the subscription, a subscription user interface element can be presented via the user interface to indicate that the object is associated with a subscription.

20 Claims, 21 Drawing Sheets

Related U.S. Application Data continuation of application No. 17/163,017, filed on Jan. 29, 2021, now Pat. No. 11,175,806.

(51) Int. Cl.
    *G06F 3/0482*     (2013.01)
    *G06F 3/0484*     (2022.01)
    *G06F 40/30*     (2020.01)
    *G06N 20/00*     (2019.01)
    *H04L 65/403*     (2022.01)
    *H04L 67/306*     (2022.01)

(52) U.S. Cl.
    CPC .............. *G06F 9/542* (2013.01); *G06F 40/30* (2020.01); *G06N 20/00* (2019.01); *H04L 65/403* (2013.01); *H04L 67/306* (2013.01)

(56) References Cited

U.S. PATENT DOCUMENTS

| | | | |
|---|---|---|---|
| 2008/0306972 | A1 | 12/2008 | Wilkin et al. |
| 2012/0030292 | A1 | 2/2012 | John |
| 2012/0185797 | A1 | 7/2012 | Thorsen et al. |
| 2016/0112497 | A1* | 4/2016 | Koushik .................... G06F 8/61 726/7 |
| 2016/0321121 | A1* | 11/2016 | Sharma ................. H04W 68/00 |
| 2016/0352672 | A1* | 12/2016 | Bai .......................... H04L 51/52 |
| 2017/0310625 | A1 | 10/2017 | Hu et al. |
| 2017/0357975 | A1* | 12/2017 | Moon ...................... H04L 67/26 |
| 2018/0197144 | A1 | 7/2018 | Frank |
| 2018/0253659 | A1 | 9/2018 | Lee et al. |
| 2018/0287982 | A1 | 10/2018 | Draeger et al. |
| 2019/0014065 | A1 | 1/2019 | Lim et al. |
| 2019/0238651 | A1 | 8/2019 | Sadanandan et al. |
| 2019/0318644 | A1* | 10/2019 | Aleem .................... G06F 21/41 |
| 2020/0104015 | A1 | 4/2020 | Li |
| 2020/0379741 | A1 | 12/2020 | Vidnovic et al. |
| 2022/0244817 | A1 | 8/2022 | McCue et al. |

OTHER PUBLICATIONS

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 4 pages.
"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 3 pages.
Internet Relay Chat, Wikipedia, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", Fujitsu Sci. Tech. J., 36, 2, (Dec. 2000) pp. 154-161.
Office Action for U.S. Appl. No. 17/163,017, mailed on Apr. 6, 2021, McCue, "Utilizing Message Metadata for Improving User Interface Presentation", 44 Pages.
Office Action for U.S. Appl. No. 17/163,095, mailed on Oct. 21, 2021, McCue, "Configuring Subscriptions for Objects of Third-Party Applications Integrated Into a Communication Platform", 17 Pages.
Office Action for U.S. Appl. No. 17/163,095, mailed Apr. 12, 2022, McCue, "Configuring Subscriptions for Objects of Third-Party Applications Integrated Into a Communication Platform", 23 pages.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/##/stewart-butterfield-the-big-pivot/, (dated Jan. 17, 2018) 21 pages.
Butterfield, Daniel Stewart, et al., U.S. Appl. No. 16/993,859, filed Aug. 14, 2020, titled "Electronic Board Associated With a Communication Platform", 45 pages.
Brevoort, Michael, et al., U.S. Appl. No. 17/152,464, filed Jan. 19, 2021, titled "Asynchronous Distributed Modular Function Calling", 44 pages.
Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 3 pages.

* cited by examiner

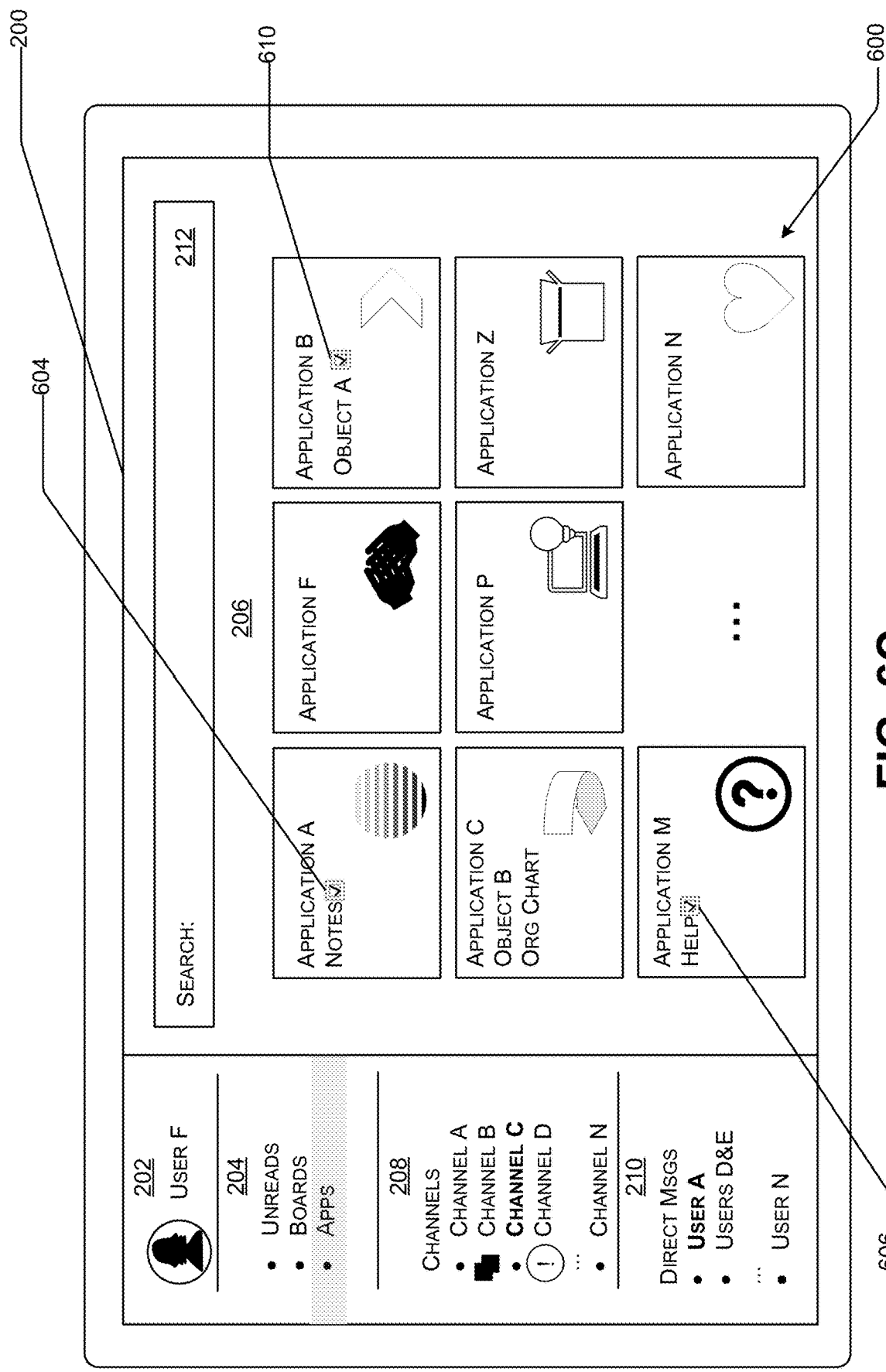

CONFIGURING SUBSCRIPTIONS FOR OBJECTS OF THIRD-PARTY APPLICATIONS INTEGRATED INTO A COMMUNICATION PLATFORM

RELATED APPLICATIONS

This application claims priority to and is a continuation of U.S. patent application Ser. No. 17/163,095, filed Jan. 29, 2021, now U.S. Pat. No. 11,609,686 issued on Mar. 21, 2023, which is a continuation of U.S. patent application Ser. No. 17/163,017, filed on Jan. 29, 2021, now U.S. Pat. No. 11,175,806 issued on Nov. 16, 2021, the entire contents of each of which are fully incorporated herein by reference.

TECHNICAL FIELD

A communication platform can leverage a network-based computing system to enable users to exchange data for communication and/or collaboration. In some examples, users can exchange messages via the communication platform. In some examples, applications associated with third-party platforms (e.g., third-party applications) can be integrated into the communication platform and can be used by users for communicating via the communication platform, performing actions in association with the communication platform, and/or otherwise providing data to the communication platform. As such, users and/or applications can generate data that can be presented via a user interface of the communication platform.

In some examples, the user interface can present a data feed indicating messages posted to and/or actions taken with respect to a particular communication channel, direct message, or the like. In existing techniques, the user interface can be cluttered and overwhelming to users. In existing techniques, the user interface can require users to scroll and/or otherwise navigate through data—from users, applications, and/or the like—to understand context of the communication and effectively utilize the communication platform. In some examples, users can miss important messages due to the amount of data they are required to scroll and/or otherwise navigate through. Further, this scrolling and/or other navigation can cause poor user experiences and can be inefficient.

In some examples, when users are using services associated with third-party platforms, transitioning between the communication platform and third-party platforms can be disruptive to the user experience. In some examples, users can be required to leave the communication platform to access data and/or other services provided by the third-party platform. Or, users can be required to provide information via multiple user interfaces to access services availed via the third-party platforms. This can cause poor user experiences and can be inefficient.

BRIEF DESCRIPTION OF THE DRAWINGS

The detailed description is described with reference to the accompanying figures. In the figures, the leftmost digit of a reference number identifies the figure in which the reference number first appears. The use of the same reference numbers in different figures indicates similar or identical components or features. The figures are not drawn to scale.

FIGS. 6A-6C illustrate another example of a user interface presented via a communication platform, as described herein.

DETAILED DESCRIPTION

Figure 1:
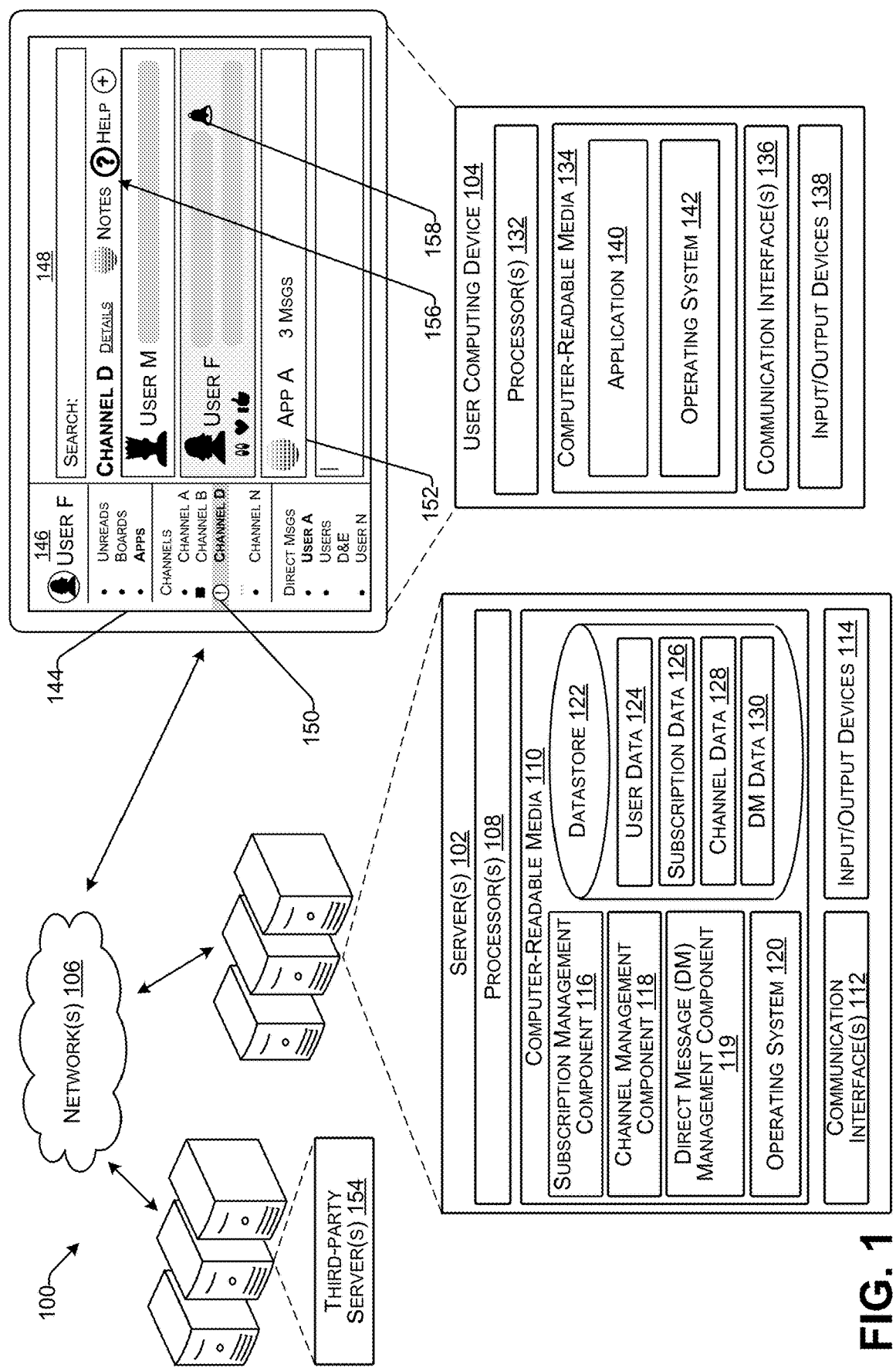
FIG. 1 illustrates an example environment for performing techniques described herein.

Management of messages and/or notifications associated with a communication platform is described herein. A communication platform, which, in some examples can be a group-based communication platform, a channel-based communication platform, a permission-based communication platform, channel-based messaging platform, and/or any other platform for facilitating communication between and among users, can enable users to exchange messages via the communication platform. In some examples, applications and/or services associated with the communication platform can provide notifications, which can present as messages, for communicating via the communication platform. In some examples, messages associated with the communication platform can be associated with metadata. Techniques described herein can utilize such metadata to improve user interfaces associated with the communication platform described herein. In some examples, such metadata can indicate priorities (e.g., low, normal, high) of the messages. In some examples, such priorities can be used to determine presentation characteristics associated with the messages. For example, high priority messages (e.g., messages that require or expect action, messages associated with particular users and/or applications, etc.) can be emphasized and/or low priority messages (e.g., messages that don't require or expect action, messages associated with particular users and/or applications, etc.) can be deemphasized to enable data presented via a user interface of the communication platform to be easier to consume. In some examples, normal and/or low priority messages can be aggregated into message digests, that aggregate messages associated with a particular application, one or more users, or a combination of application and users. Message digests can reduce clutter and improve data presentation on the user interface. As such, by utilizing metadata associated with messages, techniques described herein can offer improvements to user interfaces presented via the communication platform. This can improve user experience and user interaction between users of the communication platform and their user computing devices.

As an example, the communication platform can receive a first message from an executive of a company using the communication platform. The first message can indicate that the executive is not able to access a particular service of the communication platform. A second message can be received from an application (e.g., Application A) and can indicate that a task has been completed. In at least one example, first metadata associated with the first message can indicate that the first message is associated with a high priority. As such, the first message can be emphasized when presented in the user interface associated with the communication platform, for example by being presented in a different color, different font, different size, different animation, etc. than messages associated with other priorities. The second message can be associated with second metadata indicating that the second message is associated with a low priority. As such, the second message can be deemphasized when presented in the user interface associated with the communication platform, for example by being presented in a different color, different font, different size, different animation, etc. than messages associated with other priorities. By differentiating presentation characteristics associated with messages, based at least in part on metadata associated therewith, techniques described herein can offer improvements to existing user interfaces.

As described above, in some examples, multiple messages associated with a same characteristic (e.g., same originating source, same priority, same date and/or date range, same time and/or time period, etc.), as determined based on metadata associated with such messages, can be aggregated into a message digest, as described above. As an example, and continuing the example above, a third message can be received from the application (e.g., Application A) and can also indicate that a task has been completed. Third metadata associated with the third message can indicate that the third message is associated with a low priority. In some examples, based at least in part on the second message and the third message being associated with (i) a same originating source (e.g., Application A) and (ii) a same priority (and in some examples, timestamps within a period of time, dates within a range of dates, etc.), the second message and the third message can be presented in a message digest. That is, the message digest can represent both the second message and the third message, instead of the second and third messages being presented individually. In some examples, a user can opt to view the messages individually, for example, by interacting with the message digest as described herein. By aggregating the second and third messages into a message digest, the communication platform can reduce the amount of the user interface occupied by low (or normal priority) messages, thereby enabling users to focus on higher priority messages. As such, message digests can reduce the amount of the user interface occupied by the multiple messages, thereby reducing clutter and improving readability of messages and/or other data presented via the user interface. This, too, can provide an improvement to existing user interfaces.

In addition to managing messages, techniques described herein relate to configuring and/or managing subscriptions for notifications associated with objects. An object can include a text document, an image, a video, or any other file or data item. In some examples, an object can be associated with the communication platform and therefore can be hosted, stored, managed, and/or otherwise owned by the communication platform. In some examples, an object can be associated with a third-party platform and can therefore be hosted, stored, managed, or otherwise owned by the third-party platform. In some examples, users of the communication platform can desire to receive notifications associated with an object. Techniques described herein enable users to generate subscriptions for receiving notifications associated with objects. That is, based at least in part on receiving an authorization indication indicating that a subscription associated with an object is authorized, the communication platform can generate a subscription and notifications associated with the object can be presented via a user interface of the subscriber. In some examples, a subscription can be associated with a user (e.g., a user profile associated therewith), a group (e.g., an organization, a workspace, etc.), a resource associated with the communication platform (e.g., a communication channel, a direct message, a board, etc.), and/or the like. In examples where an object is associated with a third-party platform, an authorization indicator can be provided to the third-party platform to facilitate the subscription. In some examples, where an object is associated with a third-party platform, a subscriber can be authenticated prior to receiving notifications associated with the subscription (if authentication is required by the third-party platform).

As an example, users associated with a communication channel of the communication platform can be collaborating on a document that is managed by a cloud-based application (Application B). In at least one example, a user (User A) can share a link to the document in the communication channel. In some examples, the link can be processed (e.g., unfurled) to reveal a subscription is available for the document. In at least one example, a user interface element can be presented proximate to the link to enable User A to generate a subscription to receive notifications associated with the document. Based at least in part on detecting an interaction with the user interface element, a subscription user interface can be presented via the user computing device of User A. In some examples, the subscription user interface can be presented by the communication platform. In some examples, the subscription user interface can be presented by Application B (e.g., via an application programming interface (API)). User A can interact with the subscription user interface to authorize the subscription. In an example where Application B is installed, the communication platform can generate a subscription. In some examples, the communication platform can send an authorization indication and/or other subscription data to the third-party platform associated with Application B so that Application B can send notifications to the communication platform. As such, by subscribing to the document, Application B can send notifications to the user and/or the communication channel regarding the document (e.g., via the communication platform). For instance, when another user (User B) edits the document, Application B can send an indication of the update to the communication channel (e.g., as a notification). In some examples, such a notification can be presented as a message in the communication channel.

In some examples, third-party applications, associated with third-party platforms as described herein, can be integrated into the communication platform. In existing techniques, however, users can be required to fully install a third-party application (which can require administrative approval) before they are permitted to configure notifications, such as those described herein with respect to subscriptions. Techniques described herein enable an in-client experience to authorize third-party applications to enable a seamless, low-friction process for users to subscribe to application notifications or other subsets of functionality (e.g., "scopes") associated with third-party applications. That is, techniques described herein enable a "lightweight"

version of a third-party application to be provided to a user, which can provide some functionality to a user, without requiring the user to download the full third-party application (and thus interact with multiple user interfaces to input information required for a full download and/or await a long administrative approval process). In some examples, a third-party platform (associated with the third-party application) can opt-in to providing a feature or set of features (e.g., a scope) without requiring full installation and/or administrative approval. That is, the third-party platform can opt-in to providing a lightweight version without requiring full installation and/or administrative approval. In some examples, the lightweight version of the application can enable the user to receive notifications (e.g., in association with a subscription), without requiring the full application to be downloaded. This can provide an improvement over existing techniques.

Continuing from the example above, another user (User C) associated with the communication channel with which the document was shared may not have Application B installed on their workspace. In at least one example, a user interface element can be presented proximate to the link to enable User C to generate a subscription to receive notifications associated with the object. Based at least in part on detecting an interaction with the user interface element, a subscription user interface can be presented via the user computing device of User C. In some examples, the subscription user interface can be presented by the communication platform. In some examples, the subscription user interface can be presented by Application B (e.g., via an API). User C can interact with the subscription user interface to authorize the subscription. Responsive to receiving an authorization indication (indicating the subscription is authorized), an authorization indicator (e.g., a token) can be shared with Application B, thereby allowing Application B to send notifications to User C and/or the communication channel. In some examples, notifications can be provided by Application B without the full application being downloaded onto the workspace of User C. That is, some features of Application B can be accessible while other features of Application B may not be accessible. Such partial provisioning of features can provide a "lightweight" version of the application, Application B, to be accessible to User C. The lightweight version of the application can therefore provide some functionality to a user without requiring the user to download the full application. This can provide an improvement over existing techniques.

Techniques described herein provide improvements over existing techniques, as noted above. As described above, existing user interfaces can be cluttered and time consuming to navigate. Techniques described herein utilize metadata to offer improvements to existing user interfaces. Techniques described herein utilize metadata associated with messages to minimize distractions and bring clarity to what needs focus on the user interface. That is, techniques described herein leverage metadata to differentiate presentations of messages, automate workflows and/or other functions, and the like, thereby offering improvements to existing user interfaces. Further, techniques described herein enable users of the communication platform to stay up-to-date with work and/or events that happen across the communication platform and/or third-party platforms integrated with the communication platform. That is, techniques described herein enable the generation and/or configuration of subscriptions so that users can receive messages that are relevant to their user experience. As such, techniques described herein offer an improvement to existing technology.

FIG. 1 illustrates an example environment 100 for performing techniques described herein. In at least one example, the example environment 100 can include one or more server computing devices (or "server(s)") 102. In at least one example, the server(s) 102 can include one or more servers or other types of computing devices that can be embodied in any number of ways. For example, in the case of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to defined groups of users. In some examples, such groups of users can be defined by identifiers, which can be associated with common access credentials, domains, or the like. In some examples, the communication platform can be a hub, offering a secure and private virtual space to enable users to chat, meet, call, collaborate, transfer files or other data, message, or otherwise communicate between or among each other.

In some examples, each group can be associated with an organization, which can be associated with an organization identifier. Users associated with the organization identifier can chat, meet, call, collaborate, transfer files or other data, message, or otherwise communicate between or among each other in a secure and private virtual space available via the communication platform. In some examples, each group can be associated with a workspace, associated with a workspace identifier. Users associated with the workspace identifier can chat, meet, call, collaborate, transfer files or other data, message, or otherwise communicate between or among each other in a secure and private virtual space available via the communication platform. In some examples, a group can be associated with multiple organizations and/or workspaces. In some examples, a workspace can be associated with multiple organizations. In some examples, an organization can be associated with multiple workspaces.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (IOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like. In some examples, users can be associated with designated roles (e.g., administrator, team leader, etc.) and/or types (e.g., verified, etc.). In some examples a "user" as described herein can be a platform and/or an application associated therewith.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units, and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile, nonvolatile, removable, and/or non-removable memory or other media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a subscription management component 116, a channel management component 118, a direct message management component 119, an operating system 120, and a datastore 122. In some examples, additional or alternative components can be stored in the computer-readable media, for managing additional or alternative resources associated with the communication platform. For instance, an application management component can manage applications and/or integrations thereof, a board management component can manage boards, as described herein, and/or the like.

In at least one example, the subscription management component 116 can manage subscriptions as described herein. In at least one example, a subscription can be a source of notifications from an application. As described herein, a subscription can be associated with an object that is associated with an application. In some examples, the object and/or application can be associated with the communication platform (e.g., a user can subscribe to updates associated with snippets of content (e.g., stories), boards, communication channels, files, etc.). In some examples, the object and/or application can be associated with a third-party platform (e.g., a user can subscribe to task management updates, updates to a document stored on a third-party platform in which multiple users are collaborating on, etc.). In some examples, a user can subscribe to notifications associated with an object and/or application. That is, the user can request to associate a corresponding user profile with a subscription. In some examples, a user can subscribe a group (e.g., an organization, workspace, etc.) to notifications associated with an object. In some examples, a user can subscribe a resource of the communication platform (e.g., a communication channel, a direct message, a board, and/or the like) to notifications associated with an object. That is, the user can request to associate a resource of the communication platform with a subscription. In some examples, a user can request and/or authorize a subscription via a subscription user interface. In some examples, a user can request and/or authorize a subscription using an additional or alternative mechanism. In some examples, notifications associated with subscriptions can be presented via a user interface, as described below. In some examples, notifications can be embedded in additional or alternative resources associated with the communication platform. Additional details associated with generating subscriptions, modifying subscriptions, filtering subscriptions, terminating subscriptions, and/or the like are described herein.

In some examples, subscriptions can require authorization, by a requesting user, and in some examples, authentication of the requesting user. In some examples, the subscription management component 116 can facilitate such authorization and/or authentication processes. In examples where the object and/or application are associated with a third-party platform, the subscription management component 116 can exchange data with the third-party platform to authorize and/or authenticate the requesting user. In some examples, a subscription can prompt a particular feature or set of features, available via a third-party application, to be availed to the communication platform. In some examples, availing a particular feature or set of features can provide a "lightweight" installation of an application associated with a third-party application such that the particular feature or set of features can be available without downloading or otherwise installing the remaining feature or set of features of the third-party application. Additional details are provided below.

In at least one example, the channel management component 118 can manage communication channels (i.e., "channels") of the communication platform. In at least one example, the communication platform can be "channel-based" such that the platform can be organized into communication channels having security (that can be defined by permissions) to limit access to defined groups of users (e.g., members of the communication channels). A communication channel, or virtual space, can be a data route used for exchanging data between and among systems and devices associated with the communication platform. In some examples, a communication channel may be "public," which may allow any user within a group (e.g., associated with an organization identifier, associated with a workspace identifier, etc.) with which the communication channel is associated to join and participate in the data sharing through the communication channel. In some examples, a communication channel may be "private," which may restrict data communications in the communication channel to certain users or users having particular roles (e.g., managers, administrators, etc.) and/or types (e.g., verified, etc.).

In some examples, a communication channel may be "shared," which may allow users associated with two or more different groups (e.g., entities associated with two or more different organization and/or workspace identifiers) to join and participate in the data sharing through the communication channel. A shared communication channel may be public such that it is accessible to any user of groups associated with the shared communication channel, or may be private such that it is restricted to access by certain users or users having particular roles and/or types. A "shared communication channel" or an "externally shared communication channel" can enable two or more organizations, such as a first organization and a second organization to share data, exchange communications, and the like. In an example, the first organization and the second organization can be associated with different organization identifiers, can be associated with different business entities, have different tax identification numbers, and/or otherwise can be associated with different permissions such that users associated with the first organization and users associated with the second organization are not able to access data associated with the other organization, without the establishment of an externally shared channel. In some examples, a shared communication channel can be shared with one or more different workspaces and/or organizations that, without having a shared communication, would not otherwise have access to each other's data by the nature of the permission-based and/or group-based configuration of the communication platform described herein.

In at least one example, the channel management component 118 can receive a request to generate a communication channel. In some examples, the request can include a name that is to be associated with the communication channel, one or more users to invite to join the communication channel, and/or permissions associated with the communication channel. In at least one example, one or more user identifiers associated with one or more users and/or one or more user accounts can be mapped to, or otherwise associated with, a communication channel (e.g., a communication channel identifier associated therewith). User(s) associated with a communication channel can be "members" of the communication channel. Members of a communication channel can communicate with other members via the communication channel. That is, in at least one example, the channel management component 118 can establish a communication channel between and among various user computing devices associated with user identifiers associated with the communication channel, allowing the user computing devices to communicate and share data between and among each other. As described herein, in some examples, such communication and/or sharing of data can be via one or more messages that can be exchanged via a communication channel. In at least one example, the channel management component 118 can manage such communications and/or sharing of data. In some examples, data associated with a communication channel can be presented via a user interface.

As described above, in at least one example, one or more permissions can be mapped to, or otherwise associated with, a communication channel and/or members associated therewith. Such permission(s) can indicate which user(s) have permission to access the communication channel, actions and/or messages permitted in the communication channel, which user(s) and/or type(s) of users are permitted to add or remove members, which user(s) and/or types of users are permitted to share the communication channel with other users, a retention policy associated with data in the communication channel, whether the communication channel is public or private, or the like.

In at least one example, the direct message management component 119 can manage "direct messages," which can comprise communications with individual users or multiple specified users (e.g., instead of all, or a subset of, members of an organization). In at least one example, a "direct message" can comprise a data route, or virtual space, used for exchanging data between and among systems and devices associated with the communication platform. In some examples, a direct message can be a private message between two or more users of the communication platform. In some examples, a direct message may be "shared," which may allow users associated with two or more different groups (e.g., entities associated with two or more different organization and/or workspace identifiers) to join and participate in the data sharing through the direct message.

In at least one example, the direct message management component 119 can receive a request to generate a direct message. In some examples, the request can include identifiers associated with one or more users that are intended recipient(s) of the direct message. In at least one example, one or more user identifiers associated with one or more users and/or one or more user accounts can be mapped to, or otherwise associated with, a direct message (e.g., or direct message identifier associated therewith). User(s) associated with a direct message can communicate with one another and/or otherwise share data with one another via the direct message. As described herein, in some examples, such communication and/or sharing of data can be via one or more messages that can be exchanged via the direct message. In at least one example, the direct message management component 119 can manage such communications and/or sharing of data. In some examples, data associated with a direct message can be presented via a user interface.

In at least one example, the operating system 120 can manage the processor(s) 108, computer-readable media 110, hardware, software, etc. of the server(s) 102.

In at least one example, the datastore 122 can be configured to store data that is accessible, manageable, and updatable. In some examples, the datastore 122 can be integrated with the server(s) 102, as shown in FIG. 1. In other examples, the datastore 122 can be located remotely from the server(s) 102 and can be accessible to the server(s) 102 and/or user device(s), such as the user device 104. The datastore 122 can comprise one or multiple databases, which can include user data 124, subscription data 126, channel data 128, and direct message (DM) data 130. Additional or alternative data may be stored in the datastore and/or one or more other datastores.

In at least one example, the user data 124 can store data associated with users of the communication platform. In at least one example, the user data 124 can store data in user profiles (which can also be referred to as "user accounts"), which can store data associated with a user, including, but not limited to, one or more user identifiers associated with multiple, different organizations, groups, or entities with which the user is associated, one or more communication channel identifiers associated with communication channels to which the user has been granted access, one or more group identifiers for groups (or, organizations, teams, entities, or the like) with which the user is associated, an indication whether the user is an owner or manager of any communication channels, an indication whether the user has any communication channel restrictions, a plurality of messages, a plurality of emojis, a plurality of conversations, a plurality of conversation topics, an avatar, an email address, a real name (e.g., John Doe), a username (e.g., j doe), a password, a time zone, a status, a token, and the like. In some examples, the user data 124 can store indications of subscription(s) with which individual users are associated.

In at least one example, the user data 124 can include permission data indicative of permissions of individual users of the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with an individual user can be mapped to, or otherwise associated with, a profile and/or account associated with the user data 124. In some examples, permissions can indicate which users can communicate directly with other users, which channels a user is permitted to access, restrictions on individual channels, which workspaces the user is permitted to access, restrictions on individual workspaces, restrictions on subscriptions, permitted features of subscriptions, and the like. In at least one example, the permissions can support the communication platform by maintaining security for limiting access to a defined group of users. In some examples, such users can be defined by common access credentials, group identifiers, or the like, as described above.

In some examples, the datastore 122 can store permission data associated with permissions of groups associated with the communication platform. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a group can be mapped to, or otherwise associated with, data associated with the group. In some examples, permissions can indicate restrictions on individual groups, restrictions on communication channel(s) associated with individual groups, restrictions on user(s) associated with individual groups, and the like. In at least one example, group permissions can be mapped to, or otherwise associated with, user profiles associated with such groups.

In at least one example, the subscription data 126 can store data associated with subscriptions. In some examples, each subscription can be associated with an indication of an object associated with the subscription, an "owner" of the object (e.g., a platform storing and/or serving notifications associated therewith), at least one of a user identifier, a group identifier, a channel identifier, a direct message identifier, a board identifier, or the like associated with the subscription, a frequency of notifications for the subscription, priorities of notifications associated with the subscription, preferences associated with the subscription, etc. In some examples, an authorization indicator (e.g., a flag, token, etc.) can be associated with a subscription, thereby indicating that the subscription is authorized by a user. In some examples, an authentication indicator (e.g., a token, etc.) can be associated with a subscription, thereby indicating that a particular user and/or user computing device is authenticated (e.g., by a third-party platform) for receiving notifications via the subscription.

In some examples, the subscription data 126 can store indications of which third-party platforms can be integrated into the communication platform (and thus are available for generating subscriptions) for particular users, groups (e.g., organizations, workspaces), communication channels, direct messages, and/or the like. In some examples, such subscription data 126 can be set by administrators or other users having particular roles associated with the ability to set permissions. In some examples, the subscription data 126 can indicate particular features and/or sets of features that are available from individual third-party platforms and/or associated subscriptions.

In at least one example, the channel data 128 can store data associated with individual communication channels. In at least one example, the channel management component 118 can establish a communication channel between and among various user computing devices, allowing the user computing devices to communicate and share data between and among each other. In at least one example, a communication channel identifier may be assigned to a communication channel, which indicates the physical address in the channel data 128 where data related to that communication channel is stored.

In some examples, the channel data 128 can store data associated with permissions of individual communication channels. In some examples, permissions can be set automatically or by an administrator of the communication platform, an employer, enterprise, organization, or other entity that utilizes the communication platform, a team leader, a group leader, or other entity that utilizes the communication platform for communicating with team members, group members, or the like, an individual user, or the like. In some examples, permissions associated with a communication channel can be mapped to, or otherwise associated with, data associated with the communication channel in the channel data 128. In some examples, permissions can indicate restrictions on individual communication channels, restrictions on user(s) associated with individual communication channels, and the like.

In some examples, the channel data 128 can store indications of subscription(s) associated with particular communication channels.

In at least one example, the DM data 130 can store data associated with individual direct messages. In at least one example, the direct message management component 119 can establish a direct message between and among various user computing devices, allowing the user computing devices to communicate and share data between and among each other via the direct message. In at least one example, a direct message identifier may be assigned to a direct message, which indicates the physical address in the DM data 130 where data related to that direct message is stored. In some examples, the DM data 130 can store indications of subscription(s) associated with particular direct messages.

In some examples, the datastore 122 can be partitioned into discrete items of data that may be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with groups (e.g., organizations, workspaces), communication channels, direct messages, users, or the like.

In some examples, individual groups can be associated with a database shard within the datastore 122 that stores data related to a particular group identification. For example, a database shard may store electronic communication data associated with members of a particular group, which enables members of that particular group to communicate and exchange data with other members of the same group in real time or near-real time. In this example, the group itself can be the owner of the database shard and has control over where and how the related data is stored. In some examples, a database shard can store data related to two or more groups (e.g., as in a shared channel).

In some examples, a communication channel can be associated with a database shard within the datastore 122 that stores data related to a particular channel identification. For example, a database shard may store electronic communication data associated with the communication channel, which enables members of that particular communication channel to communicate and exchange data with other members of the same communication channel in real time or near-real time. In this example, a group or organization can be the owner of the database shard and can control where and how the related data is stored.

In some examples, a direct message can be associated with a database shard within the datastore 122 that stores data related to a particular direct message identification. For example, a database shard may store electronic communication data associated with the direct message, which enables a user associated with a particular direct message to communicate and exchange data with other users associated with the same direct message in real time or near-real time. In this example, a group or organization can be the owner of the database shard and can control where and how the related data is stored.

In some examples, individual users can be associated with a database shard within the datastore 122 that stores data related to a particular user account. For example, a database shard may store electronic communication data associated with an individual user, which enables the user to communicate and exchange data with other users of the communication platform in real time or near-real time. In some examples, the user itself can be the owner of the database shard and has control over where and how the related data is stored.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Websockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 132, computer-readable media 134, one or more communication interfaces 136, and input/output devices 138.

In at least one example, each processor of the processor(s) 132 can be a single processing unit or multiple processing units, and can include single or multiple computing units or multiple processing cores. The processor(s) 132 can comprise any of the types of processors described above with reference to the processor(s) 108 and may be the same as or different than the processor(s) 108.

The computer-readable media 134 can comprise any of the types of computer-readable media 134 described above with reference to the computer-readable media 110 and may be the same as or different than the computer-readable media 110. Functional components stored in the computer-readable media can optionally include at least one application 140 and an operating system 142.

In at least one example, the application 140 can be a mobile application, a web application, or a desktop application, which can be provided by the communication platform or which can be an otherwise dedicated application. In at least one example, the application 140 can be a native application associated with the communication platform. In some examples, individual user computing devices associated with the environment 100 can have an instance or versioned instance of the application 140, which can be downloaded from an application store, accessible via the Internet, or otherwise executable by the processor(s) 132 to perform operations as described herein. That is, the application 140 can be an access point, enabling the user computing device 104 to interact with the server(s) 102 to access and/or use communication services available via the communication platform. In at least one example, the application 140 can facilitate the exchange of data between and among various other user computing devices, for example via the server(s) 102. In at least one example, the application 140 can present user interfaces, as described herein, which in some examples can be rendered based at least in part on instructions received from the server(s) 102. In at least one example, a user can interact with the user interfaces via touch input, keyboard input, mouse input, spoken input, or any other type of input. Additional or alternative access points, such as a web browser, can be used to enable the user computing device 104 to interact with the server(s) 102 as described herein. That is, in examples where the application 140 is described as performing an operation below, in an additional or alternative example, such an operation can be performed by another access point, such as a web browser or the like.

A non-limiting example of a user interface 144 is shown in FIG. 1. As illustrated in FIG. 1, the user interface 144 can present data associated with one or more communication channels and/or other virtual spaces associated with the communication platform. In some examples, the user interface 144 can include a first section 146 (e.g., which can be a portion, pane, or other partitioned unit of the user interface 144), that includes user interface element(s) representing communication channel(s), direct message(s), and/or other virtual space(s) (e.g., boards, etc.) with which the user (e.g., account of the user) is associated. Additional details associated with the first section 146 and associated indications(s) are described below with reference to FIG. 2.

In at least one example, the user interface 144 can include a second section 148 (e.g., which can be a portion, pane, or other partitioned unit of the user interface 144) that can present data associated with virtual spaces as described herein. In some examples, the second section 148 can be associated with a data feed (or, "feed") indicating messages posted to and/or actions taken with respect to one or more communication channels and/or other virtual spaces for facilitating communications (e.g., a virtual space associated with direct message communication(s), a virtual space associated with event(s) and/or action(s), etc.) as described herein. In at least one example, data associated with the second section 148 can be associated with the same or different workspaces. That is, in some examples, the second section 148 can present data associated with the same or different workspaces via an integrated feed. In some examples, the data can be organized and/or is sortable by date, time (e.g., when associated data is posted or an associated operation is otherwise performed), type of action and/or data, workspace, communication channel, user, topic, relevance metric, and/or the like. In some examples, such data can be associated with an indication of which user (e.g., member of the communication channel) and/or application posted a message or otherwise caused the message to be posted and/or performed an action. In examples where the second section 148 presents data associated with multiple workspaces, at least some data can be associated with an indication of which workspace the data is associated with.

In some examples, the second section 148 can be associated with a virtual space, such as a board, which can present data in a configuration different from a feed. Additional details associated with boards and/or such data presentation are described below. That is, the second section 148 can present additional or alternative data in additional or alternative configurations than are described with reference to FIG. 1.

In at least one example, the first section 146 and the second section 148, in combination, can be associated with a "group-based communication user interface" from which a user can interact with the communication platform. Additional details associated with the user interface 144, the first section 146, and the second section 148, are described below with reference to FIG. 2.

In at least one example, as described herein, messages and/or other content can be presented via different presentation characteristics, which can be based on metadata associated therewith. In some examples, a message can be associated with metadata. In some examples, such a message can be called an "event message," such that the event message can trigger other functionality via the communication platform. In some examples, the metadata can indicate priorities associated with individual messages. In some examples, different priorities can cause messages to be presented with different presentation characteristics, in an effort to enable users to easily consume data presented via the user interface 144. In some examples, priorities can be determined based on hard-coded rules provided by developers, indicators that can be selected by originating users, and/or can be learned using machine learning techniques (e.g., based on interaction data indicative of user interaction with prior messages associated with the communication platform, based on identified trends among similar users, etc.). In some examples, priorities can be determined based at least in part on an originating source (e.g., which user and/or application sent the message), a date of a message, a time of a message, a type of message, content of a message, a topic of a message, and/or the like. In at least one example, such characteristics can be determined based at least in part on metadata associated with messages.

In some examples, messages that are not associated with a high priority or a low priority, that is, "normal priority" messages, can be represented by user interface elements that are associated with a particular size, color, font, animation, etc. Such a presentation can be a "default" presentation or a "standard" presentation. In some examples, user interface elements associated with high priority messages, or messages associated with a first priority, can be presented in a different size, different color, different font, different animation, and/or the like, for example, relative to "normal priority" messages. The message posted by User F in the user interface 144 is an example of a high priority message and the user interface element associated therewith is presented in a different color than the other user interface elements associated with the other messages. In some examples, high priority messages can cause a user interface element to be presented in association with the communication channel, direct message, and/or the like with which they are associated, for example, to alert a user that there is a high priority message. A non-limiting example of such a user interface element 150 is illustrated in FIG. 1. In some examples, high priority messages can cause notification settings to be overridden (e.g., pass through a "do not disturb" or "notifications off" setting), cause subsequent messages and/or alerts to be presented via the user interface 144 until the high priority message is read, and/or the like.

In some examples, low priority messages can be represented in a different size, different color, different font, different animation, and/or the like (e.g., relative to a "normal" or "high" priority messages). That is, user interface elements representative thereof can be associated with a different size, color, font, animation, and/or the like than user interface elements representative of normal or high priority messages. In some examples, low priority (and/or normal priority) messages can be aggregated into a message digest, which can be represented as a single message in a feed associated with the second section 148. The user interface 144 illustrates an example of a user interface element 152 representative of a message digest comprising three messages received from Application A ("App A"). In at least one example, the user interface element 152 can be associated with an actuation mechanism that, when actuated, can cause the individual messages associated with the message digest to be presented via the user interface 144. In some examples, the individual messages can be presented via a separate section of the user interface 144. Additional details associated with generating message digests and presenting messages associated therewith are described below.

In some examples, a user can interact with the user interface 144 to establish a subscription to individual objects and/or services of a platform. In some examples, such a platform can be the communication platform. In some examples, such a platform can be a third-party platform. In at least one example, such third-party platform(s) can be associated with third-party server(s) 154. In some examples, the third-party server(s) 154 can exchange data with the server(s) 102 to enable subscriptions and/or other integrations with the communication platform. In at least one example, a third-party platform can provide a third-party application for integration with the communication platform. Third-party applications can provide notifications associated with objects.

In at least one example, the user interface 144 can include one or more user interface elements 156 associated with existing subscriptions, which can be referred to as "subscription user interface elements." In some examples, such user interface element(s) 156 can include an indication of a third-party platform/application associated with the subscription and a name or title of an object with which the subscription is associated. In some examples, such user interface element(s) 156 can be associated with actuation mechanism(s) that when actuated can enable one or more operations via a subscription user interface. For instance, actuation of an actuation mechanism associated with the "Notes" object can cause a summary of notifications associated with the object to be presented via the user interface 144. Additional details are provided below. In some examples, actuation of an actuation mechanism associated with the "Notes" object can enable modification of the subscription associated therewith (e.g., frequency of notifications, type of notifications, etc.). In some examples, actuation of an actuation mechanism associated with the "Notes" object can enable termination of the subscription. Additional details are provided below.

In at least one example, the user interface 144 can include one or more user interface elements, such as the user interface element 158, to enable a subscription to be generated. In at least one example, the user interface element 158 can be associated with an actuation mechanism that when actuated can cause a subscription user interface to be presented via the user interface 144. The subscription user interface can enable authorization of a subscription of an object with which the user interface element 158 corresponds. In some examples, the subscription user interface can include subscription features from which a user can select, an authorization user interface element for authorizing the subscription, an input mechanism for obtaining authentication data, and/or the like. Additional details are provided below.

In at least one example, the operating system 142 can manage the processor(s) 132, computer-readable media 134, hardware, software, etc. of the user computing device 104.

The communication interface(s) 136 can include one or more interfaces and hardware components for enabling communication with various other devices (e.g., the user computing device 104), such as over the network(s) 106 or directly. In some examples, the communication interface(s) 136 can facilitate communication via Websockets, APIs (e.g., using API calls), HTTPs, etc.

The user computing device 104 can further be equipped with various input/output devices 138 (e.g., I/O devices). Such I/O devices 138 can include a display, various user interface controls (e.g., buttons, joystick, keyboard, mouse, touch screen, etc.), audio speakers, connection ports and so forth.

While techniques described herein are described as being performed by the subscription management component 116, the channel management component 118, the direct message management component 119, and the application 140, techniques described herein can be performed by any other component, or combination of components, which can be associated with the server(s) 102, the user computing device 104, or a combination thereof.

Figure 2:
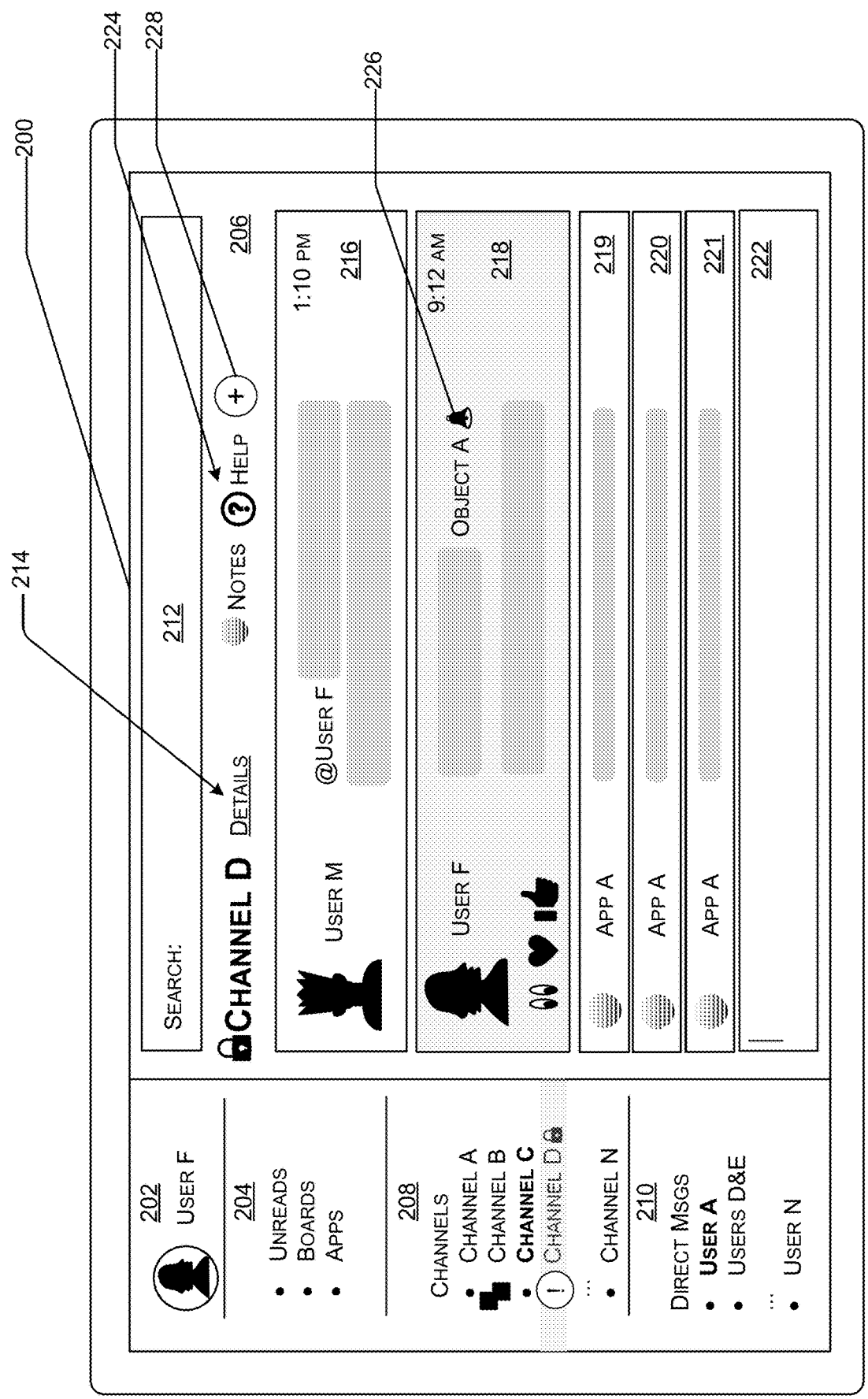
FIG. 2 illustrates an example of a user interface presented via a communication platform, as described herein.

FIG. 2 illustrates an example user interface 200 presented via a communication platform, as described herein. The user interface 200 can correspond to the user interface 144 described above with reference to FIG. 1. As described above, in some examples, a user interface 200 presented via the communication platform can include a first section 202 (which can correspond to the first section 146 described above with reference to FIG. 1) that includes user interface element(s) representing virtual space(s) associated with the workspace(s) with which the user (e.g., account of the user) is associated. In at least one example, the first section 202 can include one or more subsections, which can represent different virtual spaces. For example, a first subsection 204 can include user interface elements representing virtual spaces that can aggregate data associated with a plurality of communication channels and/or workspaces. In at least one example, each virtual space can be associated with a user interface element in the first subsection 204. In some examples, a user interface element can be associated with an actuation mechanism, that when actuated, can cause the application 140 to present data associated with the corresponding virtual space via a second section 206 of the user interface 200 (which can correspond to the second section 148 described above with reference to FIG. 1).

In at least one example, a virtual space can be associated with all unread data associated with each of the workspaces with which the user is associated. That is, in some examples, if the user requests to access the virtual space associated with "unreads," all data that has not been read (e.g., viewed) by the user can be presented in the second section 206, for example in a feed.

In another example, a virtual space can be associated with "boards" with which the user is associated. In at least one example, if the user requests to access the virtual space associated with "boards," one or more boards with which the user is associated can be presented via the user interface 200.

In at least one example, boards, as described herein, can be associated with individual groups and/or communication channels to enable users of the communication platform to create, interact with, and/or view data associated with such boards. That is, a board, which can be an "electronic board," can be a virtual space, canvas, page, or the like for collaborative communication and/or organization within the communication platform. In at least one example, a board can support editable text and/or objects that can be ordered, added, deleted, modified, and/or the like. In some examples, a board can be associated with permissions defining which users of a communication platform can view and/or edit the board. In some examples, a board can be associated with a communication channel and at least some members of the communication channel can view and/or edit the board. In some examples, a board can be sharable such that data associated with the board is accessible to and/or interactable for members of the multiple communication channels, workspaces, organizations, and/or the like.

In at least one example, a board can include section(s) and/or object(s). In some examples, each section can include one or more objects. In at least one example, an object can be associated with an object type, which can include, but is not limited to, text (e.g., which can be editable), a task, an event, an image, a graphic, a link to a local object, a link to a remote object, a file, and/or the like. In some examples, the sections and/or objects can be reordered and/or otherwise rearranged, new sections and/or objects can be added or removed, and/or data associated with such sections and/or objects can be edited and/or modified. That is, boards can be created and/or modified for various uses. That is, users can customize and/or personalize boards to serve individual needs as described herein. As an example, sections and/or objects can be arranged to create a project board that can be used to generate and/or assign tasks, track progress, and/or otherwise manage a project. Further, in some examples, boards can present company metrics and also enable access to company goals so that such information can be stored and/or accessed via a single location. In some examples, boards can be used to keep track of work progress and/or career growth, which can be used by managers or supervisors for managing and/or supervising employees, agents, and/or other workers. In at least one example, a board can be used to track incidents, incoming customer service requests, and/or the like. Additional details associated with boards are provided in U.S. patent application Ser. No. 16/993,859, filed on Aug. 14, 2020, the entire contents of which are incorporated by reference herein.

In at least one example, "apps" can be associated with applications that are integrated with the communication platform and accessible to the user (e.g., based on permission data). In some examples, if the user requests to access the virtual space associated with "apps," one or more indications of one or more applications that are integrated with and accessible to the user can be presented via the user interface 200.

In another example, although not shown in FIG. 2, the first subsection 204 can include a user interface element associated with "threads," which can be associated with messages, files, etc. posted in threads to messages posted in a communication channel, and/or "mentions and reactions," which can be associated with messages or threads where the user (e.g., User F) has been mentioned (e.g., via a tag) or another user has reacted (e.g., via an emoji, reaction, or the like) to a message or thread posted by the user. In some examples, the first subsection 204 can be associated with a user interface element representing "snippets of content," which can be associated with snippets of audio and/or video content provided by users associated with the communication platform.

In some examples, data associated with the various virtual spaces described above can be organized and/or sortable, when presented in the second section 206, by date, time (e.g., when associated data is posted or an associated operation is otherwise performed), type of action and/or data, workspace, communication channel, user, topic, relevance metric, and/or the like. In some examples, such data can be associated with an indication of which user (e.g., member of the communication channel) and/or application posted the message, performed an action, and/or the like. Additional details are described below.

In at least one example, the first section 202 of the user interface 200 can include a second subsection 208 that includes user interface elements representing communication channels. In some examples, the communication channels can include public channels, private channels, shared channels (e.g., between organizations), single workspace channels, cross-workspace channels, combinations of the foregoing, or the like. In some examples, the communication channels represented can be associated with a single workspace. In some examples, the communication channels represented can be associated with different workspaces (e.g., cross-workspace). In some examples, the communication channels represented can be associated with combinations of communication channels associated with a single workspace and communication channels associated with different workspaces.

In some examples, the second subsection 208 can depict all communication channels, or a subset of all communication channels, that the user has permission to access (e.g., as determined by the user data 124). In such examples, the communication channels can be arranged alphabetically, based on most recent interaction, based on frequency of interactions, based on communication channel type (e.g., public, private, shared, cross-workspace, etc.), based on workspace, in user-designated sections, or the like. In some examples, the second subsection 208 can depict all communication channels, or a subset of all communication channels, that the user is a member of, and the user can interact with the user interface 200 to browse or view other communication channels that the user is not a member of but are not currently displayed in the second subsection 208. In some examples, different types of communication channels (e.g., public, private, shared, etc.) can be in different sections of the second subsection 208, or can have their own subsections in the user interface 200. In some examples, communication channels associated with different workspaces can be in different portions of the second subsection 208, or can have their own sections or subsections in the user interface 200.

In some examples, the user interface elements representing communication channels can be associated with additional or alternative user interface elements that visually differentiate types of communication channels. For example, the user interface element representing Channel B is associated with a double square user interface element instead of a circle user interface element (like the user interface elements representative of the other communication channels). As a non-limiting example, and for the purpose of this discussion, the double square user interface element can indicate that the associated communication channel (e.g., Channel B) is an externally shared communication channel. In some examples, such a user interface element can be the same for all externally shared communication channels. In other examples, such a user interface element can be specific to the other group with which the externally shared communication channel is associated. In some examples, additional or alternative graphical user interface elements can be used to differentiate between public communication channels, private communication channels, shared communication channels, communication channels associated with different workspaces, and the like. In other examples, communication channels that the user is not a current member of may not be represented in the second subsection 208 of the user interface 200. In such examples, the user may navigate to a different interface (not shown) to browse additional channels that are accessible to the user but to which the user is not currently a member.

In some examples, individual of the user interface elements representative of communication channels can be associated with one or more other user interface elements for communicating information to a user. For instance, a user interface element (e.g., an encircled exclamation point) can be associated with the user interface element corresponding to Channel D, which can indicate that a high priority message has been received and is unread. As another example, a user interface element (e.g., a lock) can be associated with the user interface element corresponding to Channel D, which can indicate that the communication channel is a private channel. The user interface elements illustrated in FIG. 2 are non-limiting examples of user interface elements that can be associated with the user interface 200 to communicate information to a user.

In addition to the second subsection 208, the first section 202 can include a third subsection 210 that can include user interface elements representative of direct messages. That is, the third subsection 210 can include user interface elements representative of virtual spaces that are associated with private messages between one or more users, as described above.

As described above, in at least one example, the user interface 200 can include a second section 206 that, in some examples, can be associated with a feed indicating messages posted to and/or actions taken with respect to a communication channel and/or other virtual space (e.g., a virtual space associated with direct message communication(s), a virtual space associated with event(s) and/or action(s), etc.) for facilitating communications. As described above, in at least one example, data associated with the second section 206 can be associated with the same or different workspaces. That is, in some examples, the second section 206 can present data associated with the same or different workspaces via an integrated feed. In some examples, the data can be organized and/or is sortable by date, time (e.g., when associated data is posted or an associated operation is otherwise performed), type of action and/or data, workspace, communication channel, user, topic, relevance metric, and/or the like. In some examples, such data can be associated with an indication of which user and/or application posted the message and/or performed an action. In some examples, the message posted by an application may indicate that a status of an event (e.g., pending, in review, completed, etc.) as further discussed below.

For purposes of this discussion, a "message" can refer to any electronically generated digital object provided by a user using the user computing device 104 and/or an application and that is configured for display within a communication channel and/or other virtual space for facilitating communications (e.g., a virtual space associated with direct message communication(s), etc.) as described herein. A message may include any text, image, video, audio, or combination thereof provided by a user (using a user computing device), or a status of an event. For instance, the user may provide a message that includes text, as well as an image and a video, within the message as message contents. In such an example, the text, image, and video would comprise the message. Each message sent or posted to a communication channel of the communication platform can include metadata comprising a sending user identifier, a message identifier, message contents, a group identifier, a communication channel identifier, or the like. In at least one example, each of the foregoing identifiers may comprise American Standard Code for Information Interchange (ASCII) text, a pointer, a memory address, or the like. In at least one example, such metadata can include additional or alternative data including, but not limited to, an originating source (e.g., which user and/or application a message originated and/or was sent from), a date the message was sent, a timestamp associated with when the message was sent, a priority (e.g., low, normal, high, etc.) associated with the message, an expiration date associated with the message, an open/closed status associated with the message, a label associated with the message, an assignee associated with the message, etc. In at least one example, messages can be represented by user interface elements in the user interface 200.

In some examples, a user can comment on a message in a "thread." A thread can be a message associated with another message that is not posted to a communication channel, but instead is maintained within an object associated with the original message. Messages and/or threads can be associated with file(s), emoji(s), application(s), etc. and can be viewed based on an interaction with a user interface element representative of the thread. In some examples, such a user interface element can be associated with an actuation mechanism that when actuated can cause the threaded messages to be presented via the user interface 200. In some examples, the threaded messages can be presented via a third section of the user interface 200.

A communication channel or other virtual space can be associated with data and/or content other than messages, or data and/or content that is associated with messages. For example, non-limiting examples of additional data that can be presented via the second section 206 of the user interface 144 include members added to and/or removed from the communication channel, file(s) (e.g., file attachment(s)) uploaded and/or removed from the communication channel, application(s) added to and/or removed from the communication channel, post(s) (data that can be edited collaboratively, in near real-time by one or members of a communication channel) added to and/or removed from the communication channel, description added to, modified, and/or removed from the communication channel, modifications of properties of the communication channel, etc. Indications of such additional data and/or actions can present as messages and can be represented by user interface elements in the user interface 200.

In some examples, applications and/or other services integrated into the communication platform can perform actions and/or otherwise provide data that can be presented via the second section 206. In some examples, such actions and/or other data can be associated with events. In some examples, such actions and/or other data can present as messages. That is, actions performed by applications and/or services can be represented by user interface elements in the user interface 200. For example, an update to an object can be associated with a message presented via the second section 206. In another example, the completion of a task performed via an application can be associated with a message that can be presented via the second section 206. That is, the second section 206 can present messages associated with users and/or applications. In some examples such messages, and associated metadata, can be referred to as "events." In some examples, such applications and/or services can be third-party applications and/or services.

As described above, individual messages (from users, applications, and/or the like) can be associated with metadata. Such metadata can include identifier(s), an originating source (e.g., which user and/or application a message originated and/or was sent from), a date the message was sent, a timestamp associated with when the message was sent, a priority (e.g., low, normal, high, etc.) associated with the message, an expiration date associated with the message, an open/closed status associated with the message, a label associated with the message, an assignee associated with the message, etc. In at least one example, such metadata can be appended to the individual messages when they are received by the server(s) 102. That is, in such an example, an originating source can generate and/or associate metadata with a message prior to sending it to the server(s) 102. In at least one example, metadata can be generated by the server(s) 102 and associated with the message by the server(s) 102. In some examples, metadata associated with a message can be generated in part by the originating source and in part by the server(s) 102. In some examples, the metadata can be used for determining how to present a message in the user interface 200. For example, messages with different priorities indicated in associated metadata can be presented with different presentation characteristics (e.g., size, font, color, animation, in a message digest (or not), etc.). In some examples, metadata associated with a message can be used for annotating the user interface 200, searching, filtering, and/or triggering workflows. In some examples, metadata associated with messages can be used for data loss prevention, such as for flagging data loss prevention violations. In some examples, metadata associated with messages can trigger functions. Additional details associated with triggering of functions are provided in U.S. patent application Ser. No. 17/152,464, filed on Jan. 19, 2021, the entire contents of which are incorporated by reference herein.

In some examples, the second section 206 can comprise a feed associated with a single communication channel. In such examples, data associated with the communication channel can be presented via the feed. In at least one example, data associated with a communication channel can be viewable to at least some of the users of a group of users associated with a same group identifier. In some examples, for members of a communication channel, the content of the communication channel (e.g., messaging communications and/or objects) can be displayed to each member of the communication channel. For instance, a common set of group-based messaging communications can be displayed to each member of the communication channel such that the content of the communication channel (e.g., messaging communications and/or objects) may not vary per member of the communication channel. In some examples, messaging communications associated with a communication channel can appear differently for different users (e.g., based on personal configurations, group membership, permissions, policies, etc.).

In at least one example, the format of the individual communication channels or virtual spaces may appear differently to different users. In some examples, the format of the individual communication channels or virtual spaces may appear differently based on which workspace or organization a user is currently interacting with or most recently interacted with. In some examples, the format of the individual communication channels or virtual spaces may appear differently for different users (e.g., based on personal configurations, group membership, permission(s), etc.). In some examples, presentation characteristics can appear differently to different users (e.g., based on personal configurations, group membership, permission(s), etc.).

In at least one example, the user interface 200 can include a search mechanism 212, wherein a user can input a search term and the server(s) 102 can perform a search associated with the communication platform. In some examples, the search can be performed across each group with which the user is associated, or the search can be restricted to a particular group, based on a user specification.

In FIG. 2, the user can interact with the user interface element that corresponds to Channel D in the second subsection 208 and as such, a feed associated with the communication channel can be presented via the second section 206 of the user interface. In some examples, the second section 206 can be associated with a header that includes user interface elements 214 representing information associated with Channel D. Furthermore, the second section 206 can include user interface elements 216, 218, 219, 220, and 221, which each represent messages posted to the communication channel. As illustrated, the user interface elements 216-221 can include an indication of a user and/or application that posted the message, a time when the message was posted, content associated with the message, reactions associated with the message, and/or the like. In at least one example, the second section 206 can include an input mechanism 222, which can be associated with a message composition user interface to enable a user to compose a message to be posted to the communication channel.

In some examples, different messages can be presented differently in the second section based at least in part on metadata associated therewith. In an example, metadata associated with messages can indicate priorities associated therewith. For instance, a message associated with a first priority can be presented in association with a first presentation characteristic. Such a first presentation characteristic can cause the user interface element representative of the message associated with the first priority to be associated with a particular size, color, font, or the like. In some examples, if the first priority is a high priority, the first presentation characteristic can emphasize the message, thereby causing the message to be more noticeable than other messages. The user interface element 218 is associated with a different color than the other user interface elements 216, 219, 220, and 221, thereby indicating that the message associated therewith is a high priority message. In another example, a message associated with a second priority (e.g., a "normal" priority) can be presented in association with a second presentation characteristic. Such a second presentation characteristic can cause the message associated with the second priority to be associated with a particular size, color, font, or the like associated with a standard or default presentation. In yet another example, a user interface element representative of a message associated with a third priority can be presented in association with a third presentation characteristic. Such a third presentation characteristic can cause the message associated with the third priority to be associated with a particular size, color, font, or the like, which can deemphasize the message, causing the message to be less noticeable than the other messages. The user interface elements 219, 220, and 221 are associated with a smaller size than the other user interface elements 216 and 218, thereby indicating that the messages associated therewith are low priority messages.

In some examples, the user interface 200 can be associated with one or more user interface elements 224 that indicate (existing) subscriptions associated with the user (e.g., User F) and/or the communication channel (e.g., Channel D) (or direct message, board, etc.). The user interface element(s) 224 can correspond to the user interface element(s) 156 described above with reference to FIG. 1. In some examples, such user interface element(s) 224 can include an indication of a third-party platform (e.g., an application associated therewith) associated with the subscription and a name or title of an object with which the subscription is associated. In some examples, such user interface element(s) 224 can be associated with actuation mechanism(s) that when actuated can enable one or more operations. Additional details are provided below.

In at least one example, the user interface 200 can include one or more user interface elements, such as the user interface element 226 and the user interface element 228, to enable subscriptions to be generated and/or otherwise configured. The user interface element 226 can correspond to the user interface element 158 described above with reference to FIG. 1. In at least one example, the user interface element 226 can be presented proximate to an object for which a subscription is available. In at least one example, the user interface element 226 can be associated with an actuation mechanism that when actuated can cause a subscription user interface to be presented via the user interface 200. The subscription user interface can enable authorization of a subscription of an object with which the user interface element 226 corresponds. In some examples, the subscription user interface can include subscription features from which a user can select, an authorization user interface element for authorizing the subscription, an input mechanism for obtaining authentication data, and/or the like.

In some examples, the user interface element 228 can be associated with a mechanism for generating a subscription. In some examples, the user interface element 228 can be presented proximate to the user interface elements 224 representative of existing subscriptions (e.g., subscription user interface elements). In at least one example, the user interface element 228 can be associated with an actuation mechanism that when actuated can cause a subscription user interface to be presented via the user interface 200. The subscription user interface can enable authorization of a subscription. In some examples, the subscription user interface can include subscription features from which a user can select, an authorization indication for authorizing the subscription, an input mechanism for obtaining authentication data, and/or the like. Additional details are provided below.

Figure 3A:
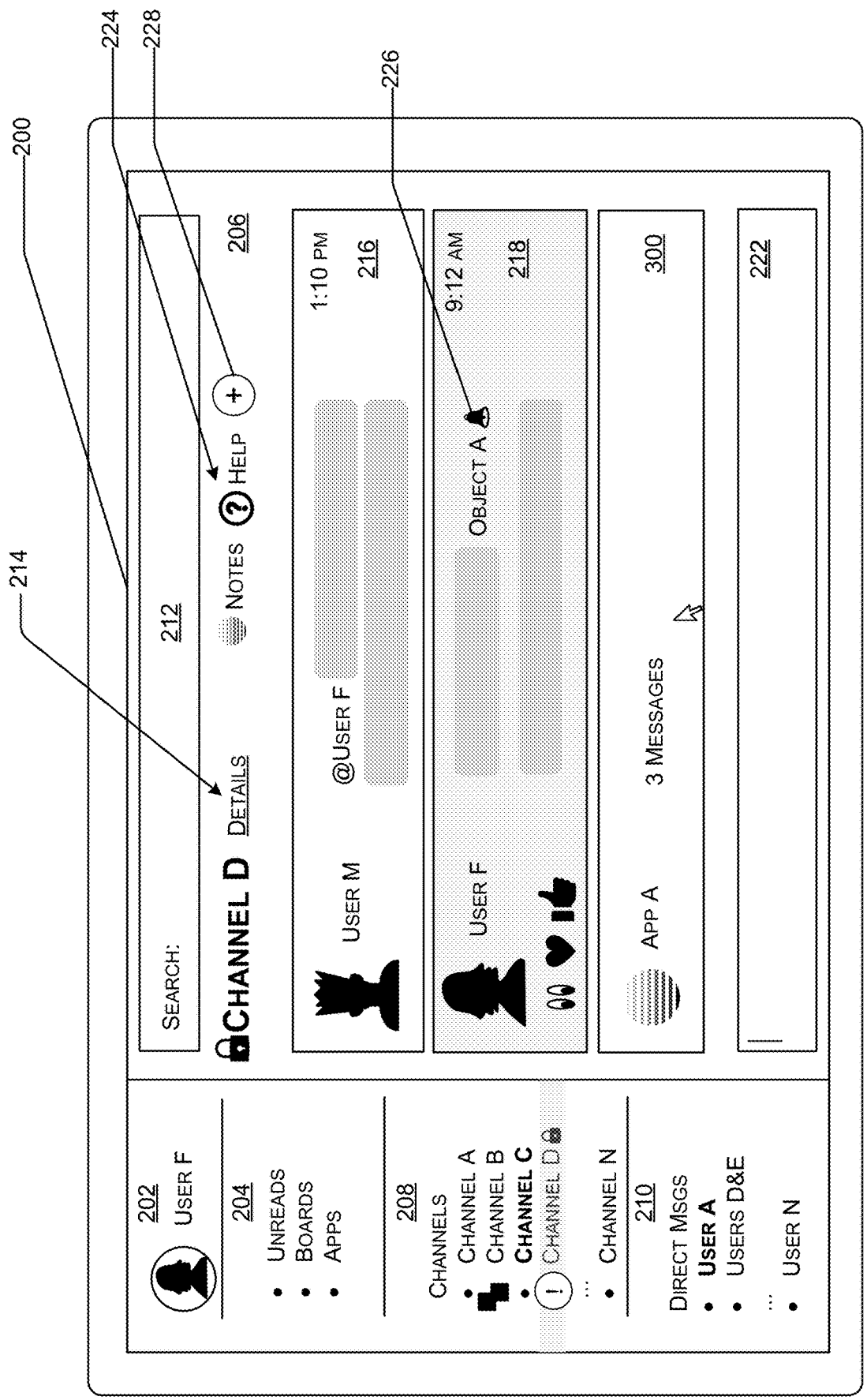
FIGS. 3A-3B illustrate another example of the user interface presented via a communication platform, as described herein.

In some examples, one or more messages can be aggregated into a message digest, which can be presented via a single user interface element. For example, the user interface elements 219-221 are all associated with the same originating source (e.g., Application A) and the same priority (e.g., low priority). As such, in at least one example, a single user interface element 300 can be presented via the second section 206 instead of the three user interface elements representative of each message. Such an aggregation can be called a "message digest." An example of the user interface 200, wherein the messages associated with Application A are presented via a message digest, is illustrated in FIG. 3A.

In at least one example, a component of the server(s) 102 can analyze metadata associated with received messages to determine whether to generate a message digest instead of presenting the messages individually via the user interface 200. In at least one example, based at least in part on determining that two or more messages are associated with a same originating source (e.g., same user and/or same application), a same priority, and/or the like, the component of the server(s) 102 can determine to generate a message digest associated with the two or more messages. In some examples, the component of the server(s) 102 can determine whether the two or more messages are associated with timestamps within a period of time and, based on a determination that the two or more messages are associated with timestamps within the period of time, can determine to generate a message digest. In some examples, the component of the server(s) 102 can determine whether the two or more messages are associated with a same date or date range and, based on a determination that the two or more messages are associated with a same date or date range, the component of the server(s) 102 can determine to generate a message digest.

In some examples, if any one of the messages is associated with a particular characteristic that indicates that it should not be added to a message digest, the component of the server(s) 102 can refrain from generating a message digest and/or can refrain from adding that message to the message digest (e.g., and present it individually). For example, if any one of the messages is associated with an action item, the component of the server(s) 102 can refrain from generating a message digest and/or can refrain from adding that message to the message digest. As another example, if any one of the messages is associated with a high priority, the component of the server(s) 102 can refrain from generating a message digest and/or can refrain from adding that message to the message digest.

Figure 3B:
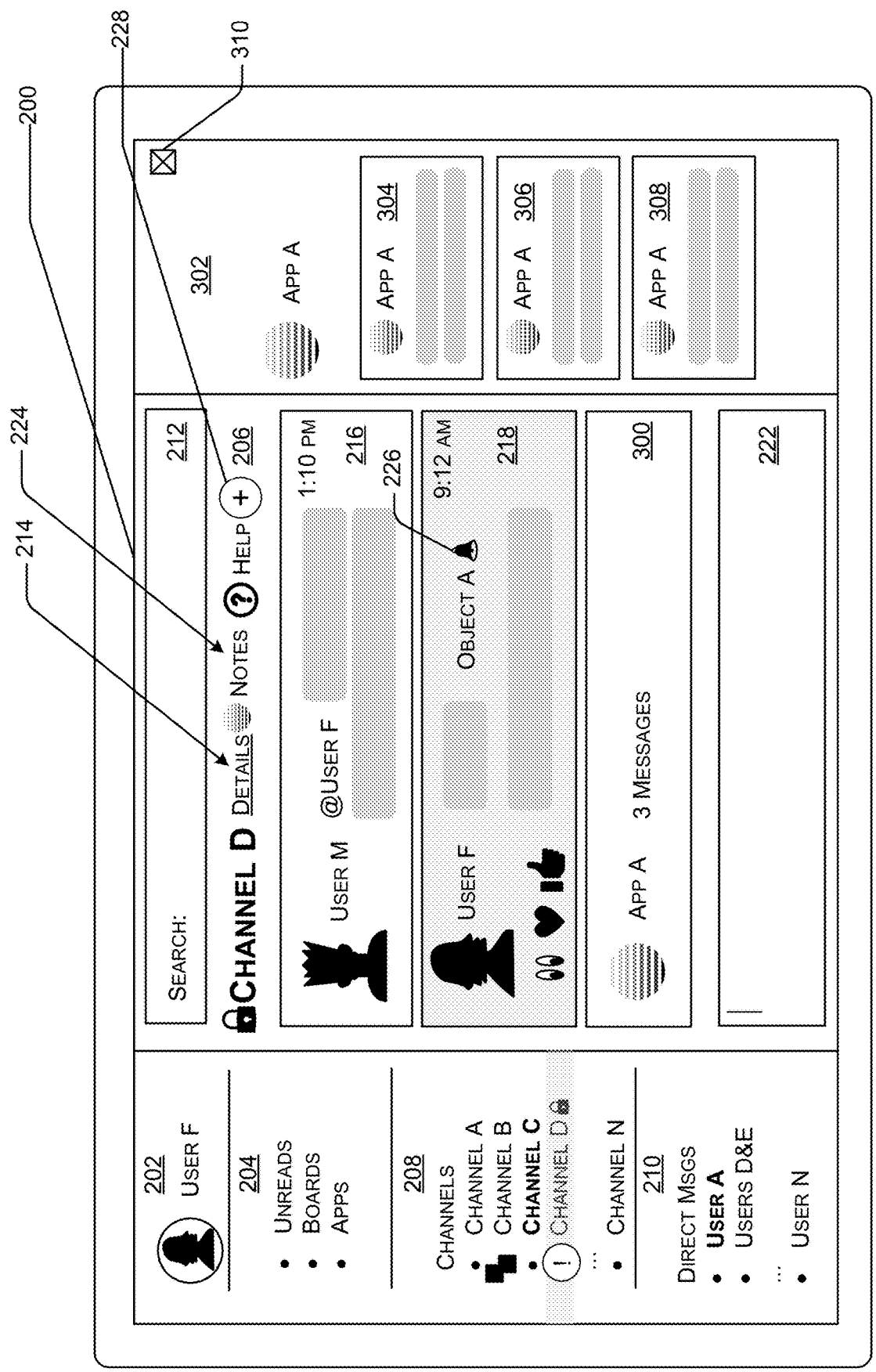

In at least one example, the user interface element representative of the message digest, such as the user interface element 300, can be associated with an indication of the originating source (e.g., user and/or application) and, in some examples, a number of messages in the message digest (e.g., three messages). In some examples, the user interface element 300 can include a date and/or date range, a timestamp and/or period of time, and/or the like. In at least one example, the user interface element 300 can be associated with an actuation mechanism. In at least one example, based at least in part on actuating the actuation mechanism, the messages can be presented via the user interface 200, as illustrated in FIG. 3B. That is, the component of the server(s) 102 can receive an indication of an actuation of the actuation mechanism (e.g., from the application 140) and can cause the user interface 200 to present the individual messages associated with the message digest.

As illustrated in FIG. 3B, the user interface 200 can be updated to include a third section 302. The third section 302 can be proximate to the second section 206 and can be associated with one or more user interface elements representative of the one or more messages that were aggregated and presented via the message digest. That is, the user interface elements 304, 306, and 308 can represent the messages aggregated and presented via the message digest represented by the user interface element 300. In some examples, the user interface elements 304-308 can be associated with presentation characteristics determined based on their corresponding priorities. In some examples, the user interface elements 304-308 can be presented with standard or default presentation characteristics. In at least one example, the third section 302 can be associated with a user interface element 310 that can enable the third section 302 to be closed. That is, based at least in part on detecting an interaction with the user interface element 310, the application 140 can close the third section 302 and the user interface 200 can return to the user interface 200 as presented in FIG. 3A.

With reference to FIGS. 2 and 3A-3B, priorities can mean different things to different users. In some examples, priorities can affect presentation characteristics differently for different users. For instance, a customer service ticket associated with a code glitch can be of high priority to a developer but may be of low priority to a designer. As such, in some examples, the component of the server(s) 102 can modify priorities and/or presentation characteristics based at least in part on user data associated with recipient user(s).

Figure 4A:
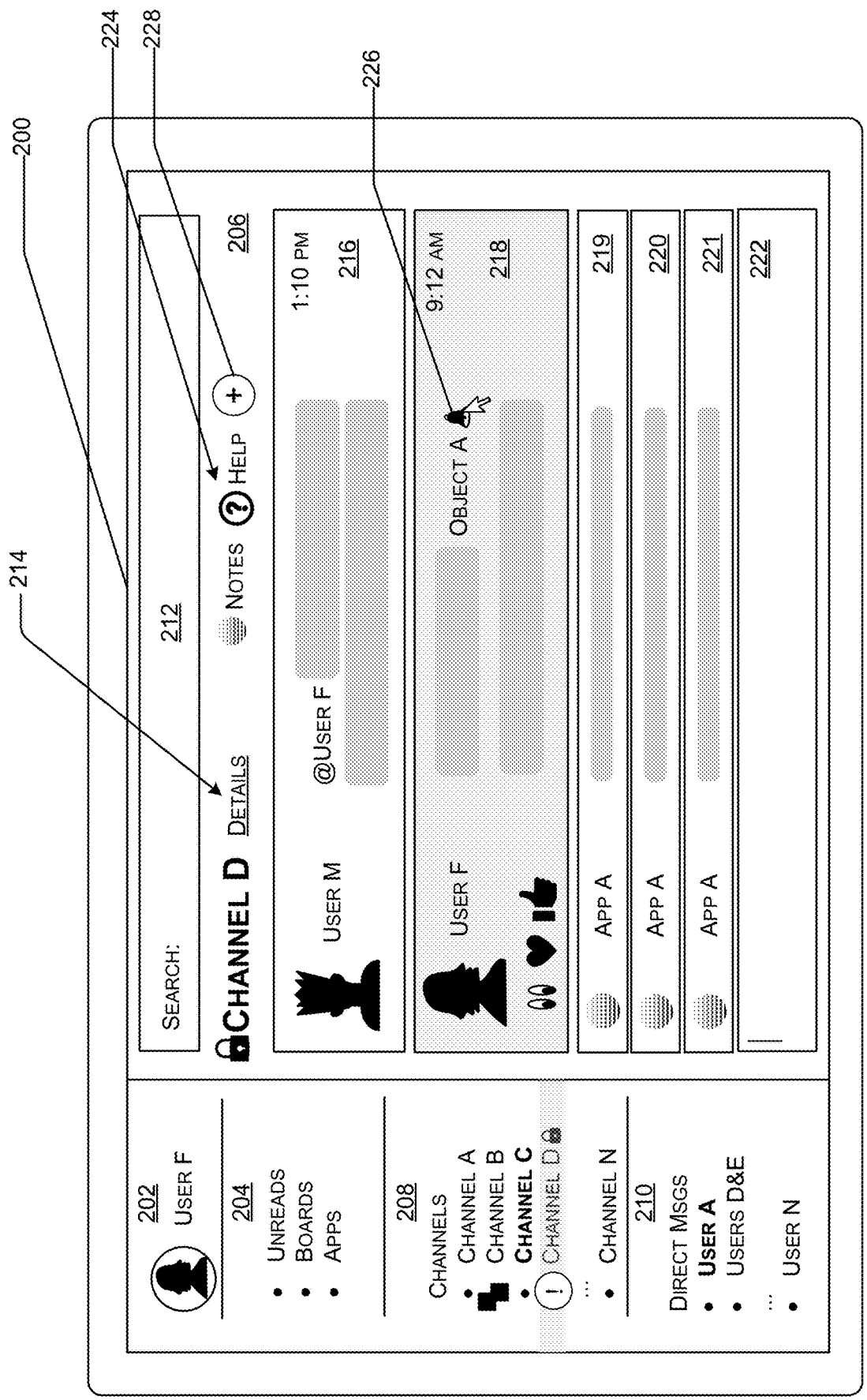
FIGS. 4A-4D illustrate an example of the user interface presented via a communication platform, as described herein.
Figure 4B:
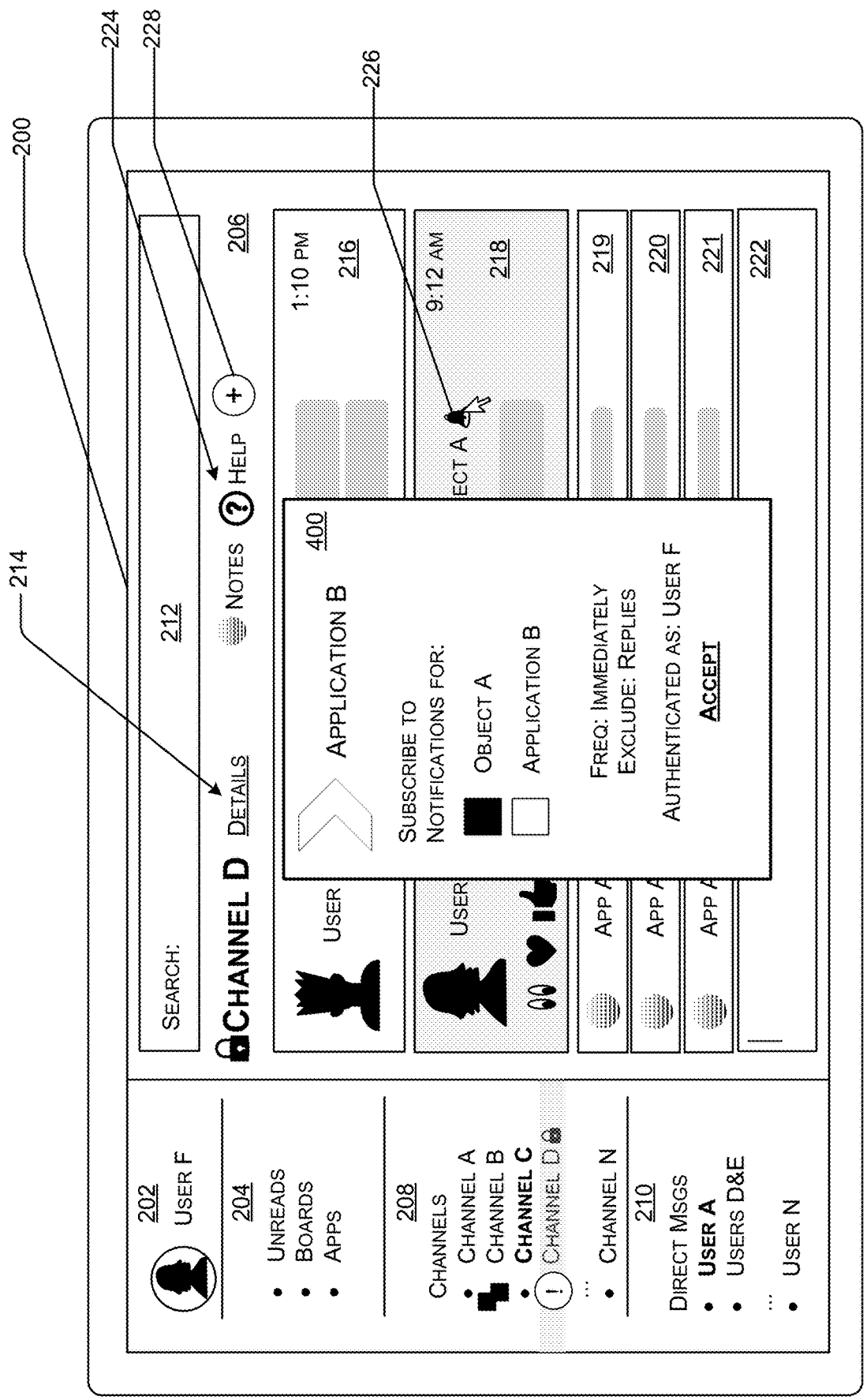

As described above with reference to FIG. 2, the user interface 200 can include user interface element(s) to enable the configuration of a subscription. In at least one example, a user can interact with the user interface element 226, as illustrated in FIG. 4A. In some examples, the user interface element 226 can be associated with an actuation mechanism and the application 140 can detect an interaction therewith (e.g., actuation thereof). In at least one example, the subscription management component 116 can receive an indication associated with actuation of the actuation mechanism (e.g., from the application 140) and can cause a subscription user interface 400 to be presented via the user interface 200, as illustrated in FIG. 4B. In at least one example, the subscription user interface 400 can be presented via an embedded browser, a modal window, a pop-up, an overlay, a section of the user interface 200, or a new user interface. In some examples, the subscription user interface 400 can be presented by the communication platform (e.g., the subscription management component 116). In some examples, the subscription user interface can be presented by a third-party platform (e.g., via an API). For instance, the subscription user interface can be presented by the third-party platform modal that enables a user to be authenticated using OAuth via an API.

In at least one example, the subscription user interface 400 can include an indication of the application associated with the subscription and options associated with the subscription (e.g., features thereof). For example, as illustrated in FIG. 4B, the user can opt to subscribe to notifications for a particular object or an application. In some examples, such options can include different subscription features. In some examples, the subscription user interface 400 can include input mechanisms to enable the user to designate preferences associated with the subscription (e.g., frequency of notifications, types of notifications to include or exclude, etc.)

In some examples, the subscription user interface 400 can include authentication data (e.g., which can be determined based at least in part on user data associated with the user) and/or an input mechanism for the user to input authentication data. Such authentication data can be used for authenticating the user and/or the user computing device with a third-party platform, if the subscription is associated with a third-party application that requires authentication.

In some examples, the subscription user interface 400 can include an authorization user interface element, which can enable the user to provide authorization for the subscription. In at least one example, such an authorization indication can be a control or other selectable element (e.g., "Accept" in FIG. 4B), which can be associated with an actuation mechanism. Actuation of the mechanism can provide an authorization indication (e.g., an indication of authorization) to be sent from the application 140 to the server(s) 102. In at least one example, based at least in part on receiving an authorization indication from the application 140, the subscription management component 116 can generate a subscription. In some examples, a subscription can be specific to a particular user. In some examples, a subscription can be specific to a communication channel, direct message, board, and/or other resource associated with the communication platform. In at least one example, the subscription management component 116 can associate an indication of the subscription, in the datastore 122 for instance, with the object and/or application, the user associated with the subscription, the communication channel associated with the subscription, the direct message associated with the subscription, the board associated with the subscription, and/or the like. In some examples, if the subscription is associated with an object associated with the communication platform, the subscription data 124 can store the authorization indication.

In at least one example, if the subscription is associated with a third-party platform, based at least in part on receiving the authorization indication from the application 140, the subscription management component 116 can send an authorization indicator (e.g., an access token) to the third-party server(s) 154 (which can indicate that the user, communication channel, direct message, board, etc. is authorized to receive notifications associated with the object and/or third-party platform). In some examples, the subscription management component 116 can send an indication of the object associated with the subscription, the user associated with the subscription, the communication channel associated with the subscription, the direct message associated with the subscription, the board associated with the subscription and/or the like to the third-party server(s) 154. In some examples, the subscription management component 116 can send an indication of the frequency at which notifications are to be received and/or other specified preferences to the third-party server(s) 154. Such information (e.g., object, user, communication channel, direct message, board, frequency, etc.) can be associated with a message as metadata and can "trigger" the subscription such that the third-party platform can begin to send notifications to the server(s) 102, which can route the notifications to the relevant end user(s) and/or resource(s) (e.g., communication channel, direct message, board, etc.) based on the specified preferences of the user. In some examples, such an authorization process can utilize OAuth authorization framework or additional or alternative authorization frameworks.

In some examples, if authentication data is required to authenticate the user and/or the user computing device requesting the subscription, the subscription management component 116 can determine authentication data (e.g., based on authentication data input via the subscription user interface 400, accessing authentication data stored in the datastore 122, etc.) and can send the authentication data to the third-party server(s) 154 (e.g., with consent of the user). The third-party server(s) 154 can return an authentication indicator (e.g., a token), which can be stored by the server(s) 102 to indicate that the user is authenticated to receive notifications via the subscription.

Figure 4C:
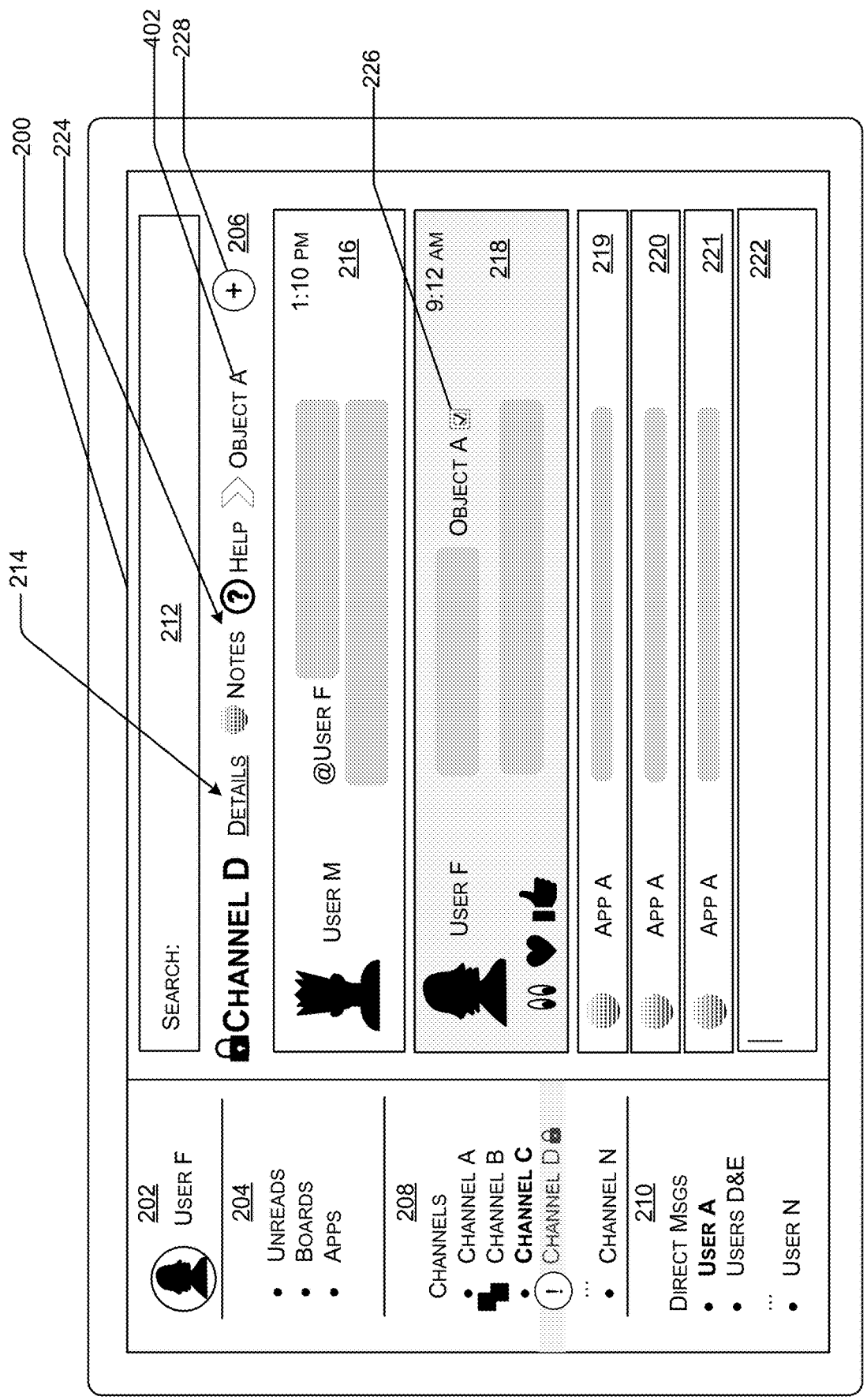

In at least one example, based at least in part on the subscription being generated, an indication of the subscription can be presented via the user interface 200, for example, proximate to other indication(s) of other existing subscription(s). As illustrated in FIG. 4C, a user interface element 402, representative of the subscription associated with Object A, is presented proximate to the user interface elements 224 associated with previously existing subscriptions. As described above, such a user interface element can be a "subscription user interface element" indicating that the object is associated with a subscription. In some examples, the user interface element 226 can be updated to a new user interface element 403 to indicate that the object is associated with a subscription.

Figure 4D:
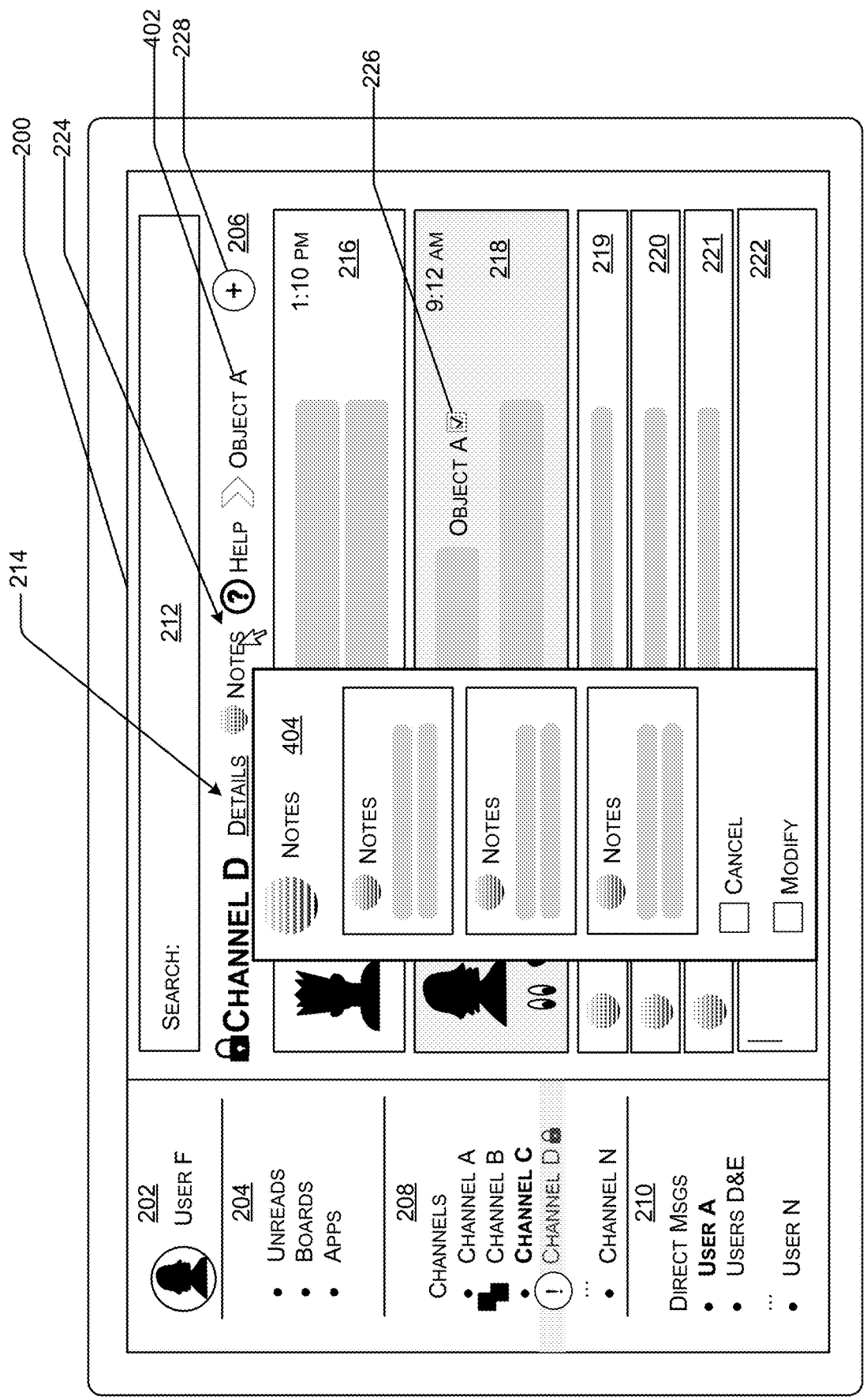

In at least one example, the user interface elements 224 and 402 can be associated with actuation mechanisms, as described above. In at least one example, based at least in part on detecting an actuation of an actuation mechanism associated with one of the user interface elements 224 or 402, the application 140 can send an indication of such to the server(s) 102. As illustrated in FIG. 4D, the subscription management component 116 can receive an indication of such an actuation and can cause a summary user interface 404 to be presented via the user interface 200. In some examples, the summary user interface 404 can be presented as a pop-up (as shown), an overlay, a new section of the user interface, a new user interface, etc. In some examples, the summary user interface 400 can present a summary of notifications associated with the subscription to which the actuated actuation mechanism/user interface element corresponds. In some examples, the summary of notifications can include all notifications since a previous summary was requested, all unread notifications, all notifications associated with the subscription, a subset of notifications associated with the subscription, etc. In some examples, the notifications can be organized based on date, time, topic, priority, last interaction, etc.

In some examples, the summary user interface 400 can include one or more additional user interface elements to enable termination of the subscription (e.g., "Cancel") or modification of the subscription (e.g., "Modify"). In some examples, based at least in part on detecting an interaction with the user interface element associated with the modification mechanism, a settings user interface can be presented to enable the user to provide preferences and/or otherwise modify features of the subscription. Input to the summary user interface 404 can be provided to the subscription management component 116 (e.g., via the application 140) and the subscription management component 116 can terminate or modify the subscription based thereon.

Figure 5A:
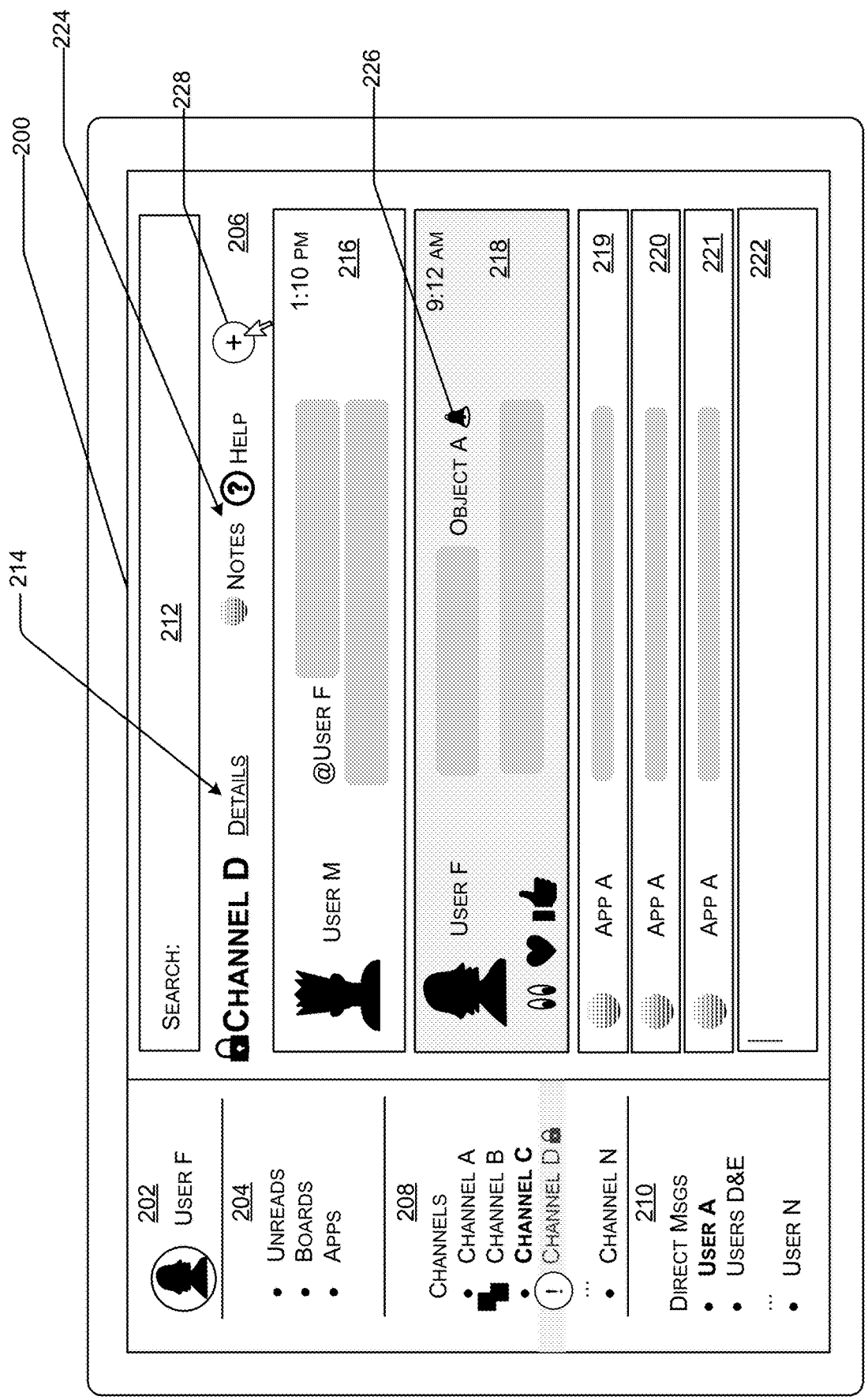
FIGS. 5A-5C illustrate another example of a user interface presented via a communication platform, as described herein.
Figure 5B:
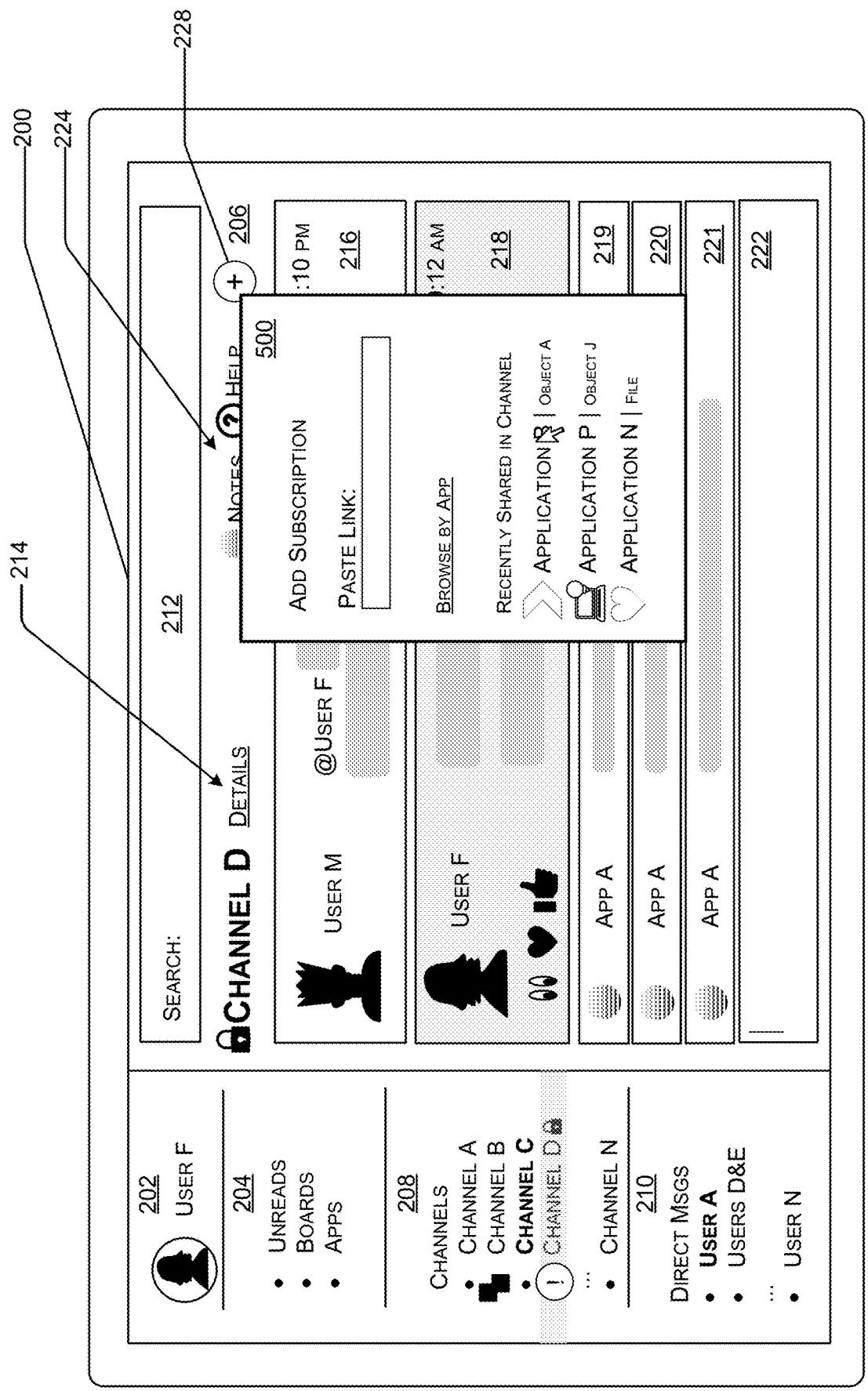

In FIG. 5A, much like in FIG. 4A, the user is interacting with a user interface element that enables the configuration of a subscription. In FIG. 5A, however, the user is interacting with the user interface element 228 instead of the user interface element 226. In FIG. 4A, the user interface element 226 is proximate to an object associated with an available subscription. In FIG. 5A, the user interface element 228 is not proximate to an object associated with an available subscription. As such, the subscription user interface 500, as illustrated in FIG. 5B, may be associated with different data and/or configurations than the subscription user interface 400 of FIG. 4B. In some examples, subscription user interface 500 enables a user to add subscriptions related to any application or object associated with the communication channel (e.g., Channel D) or workspace (e.g., with which the user is associated). For example, as illustrated in FIG. 5B, the subscription user interface 500 can include an input mechanism to enable a user to paste a link associated with an object for which it desires to generate a subscription. In some examples, the subscription user interface 500 can enable the user to browse by application, which can cause the same or a similar presentation as selecting the "app" indication in the first subsection 204 of the first section 202 of the user interface 200. In some examples, the subscription user interface 500 can include indications of objects recently shared in the channel so that the user can interact with an indication to authorize a subscription with the corresponding object.

Figure 5C:
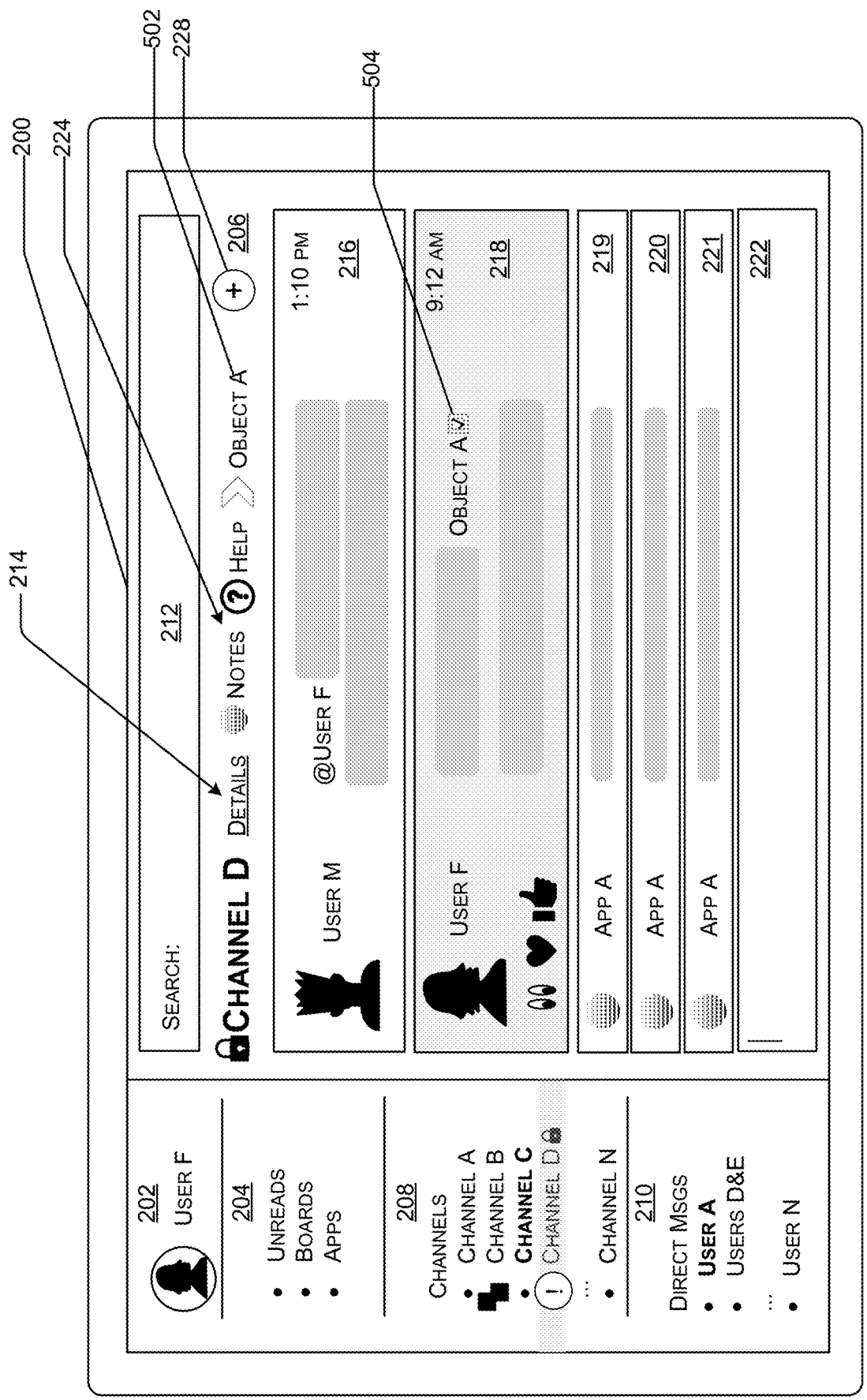

In at least one example, the application 140 can receive an input associated with an object for which the user desires to subscribe (e.g., via a link input into the input mechanism, selection of an application, selection of an object, and/or the like) and can send an indication of such to the server(s) 102. In some examples, such an input can be associated with an authorization indication, as described herein, and, in some examples, a subscription request. The subscription management component 116 can receive the indication of such and can generate a subscription as described above. In at least one example, based at least in part on the subscription being generated, an indication of the subscription can be presented via the user interface 200, for example, proximate to other indication(s) of other existing subscription(s). As illustrated in FIG. 5C, a user interface element 502, representative of the subscription associated with Object A, is presented proximate to the user interface elements 224 associated with previously existing subscriptions. In some examples, the user interface element 226 can be updated to a new user interface element 504 to indicate that the object is associated with a subscription.

Figure 6A:
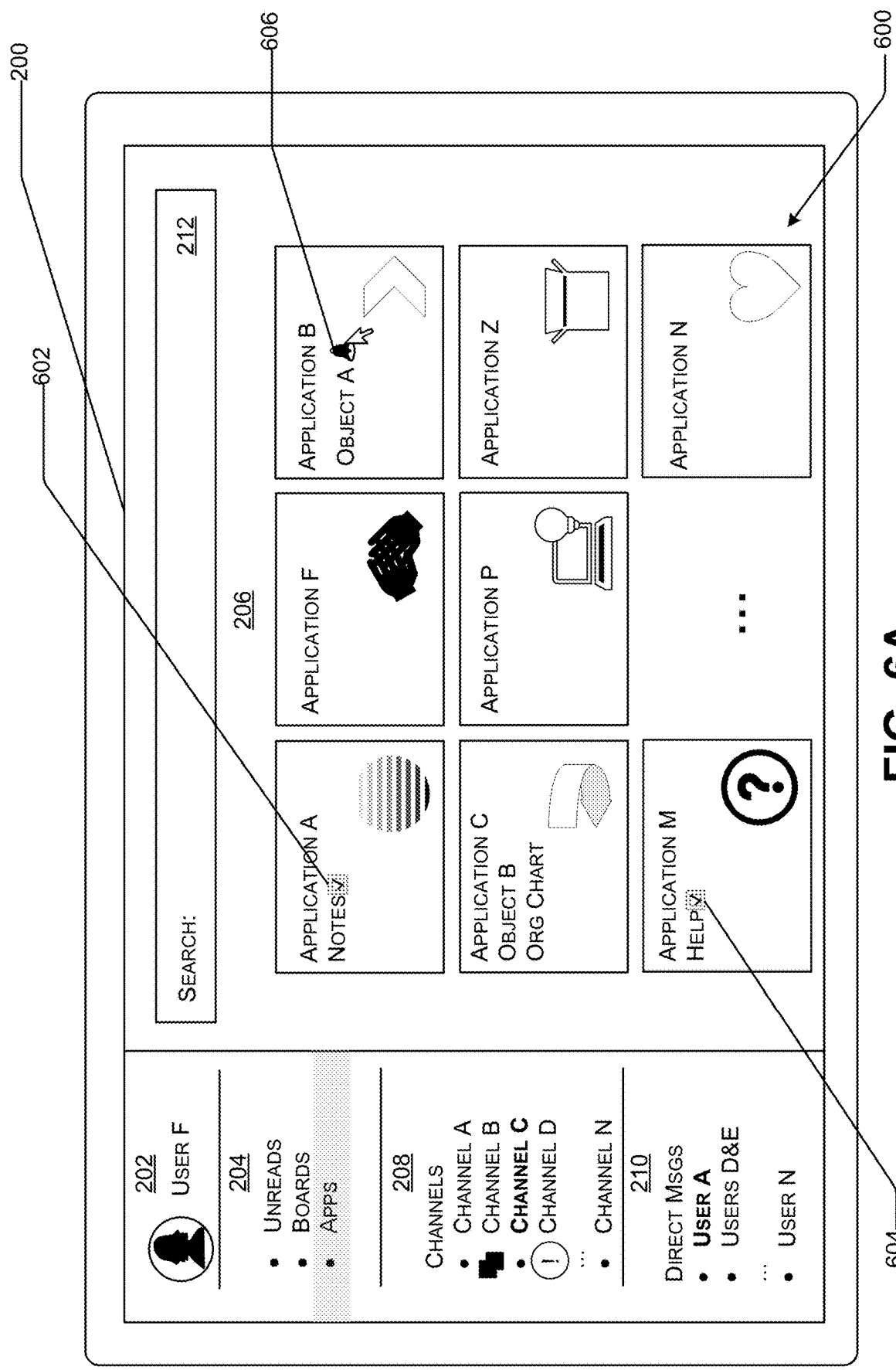

FIG. 6A illustrates an example of the user interface 200, wherein the second section 206 presents user interface elements 600 representative of individual applications integrated with the communication platform. In some examples, the second section 206 can present such user interface elements 600 based at least in part on an interaction with the "apps" indication in the first subsection 204 of the first section 202. In some examples, the second section 206 can present such user interface elements 600 based at least in part on a request to "browse applications" received via a subscription user interface, such as the subscription user interface 500 described above with reference to FIG. 5B. In some examples, objects associated with individual of the applications can be represented by indications associated with user interface elements representative of their respective applications. For example, the "Notes" object referenced herein is shown as associated with Application A. In some examples, objects associated with a current subscription can be associated with user interface elements indicating such. For instance, the "Notes" object is associated with a user interface element 602 and the "Help" object is associated with a user interface element 604, indicating both are associated with a current subscription.

Figure 6B:
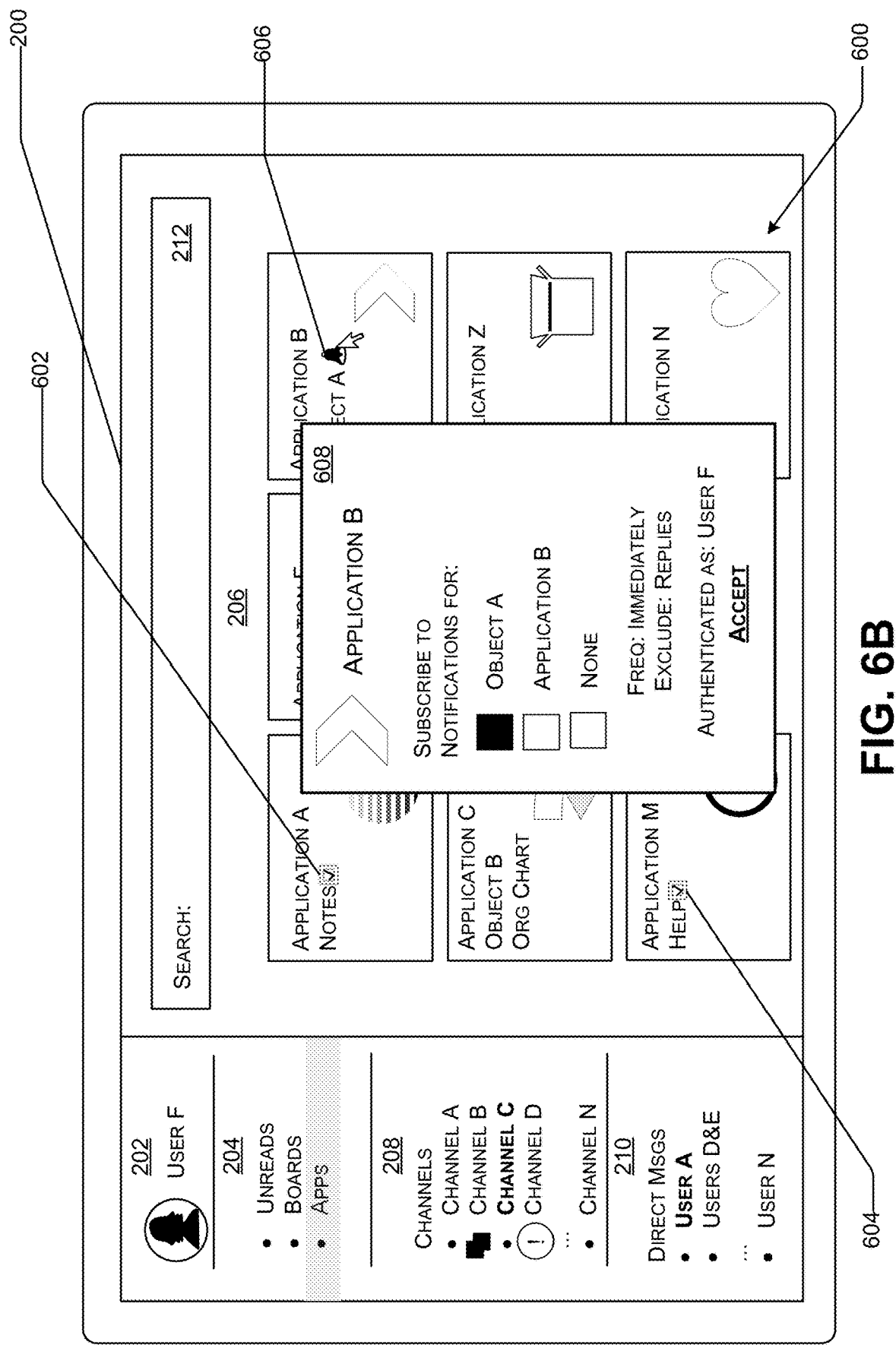

In some examples, the user interface 200 can include user interface elements, as described above, to enable configuration of a subscription. In at least one example, a user interface element 606 can be presented proximate an object (e.g., Object A), which can be associated with Application B. As such, the user interface element 606 can be presented in association with the user interface element corresponding to Application B. In some examples, the user interface element 606 can be associated with an actuation mechanism. In at least one example, based at least in part on detecting an interaction with the user interface element 606 (e.g., an actuation of the associated actuation mechanism), a subscription user interface 608 can be presented via the user interface 200, as illustrated in FIG. 6B. The subscription user interface 608 can include the same information as the subscription user interface 400 described above with reference to FIG. 4B. In at least one example, based at least in part on authorizing a subscription, the user interface 200 can be updated to include a user interface element 610 indicating that associated object (e.g., Object A) is associated with a subscription, as illustrated in FIG. 6C.

Figure 7A:
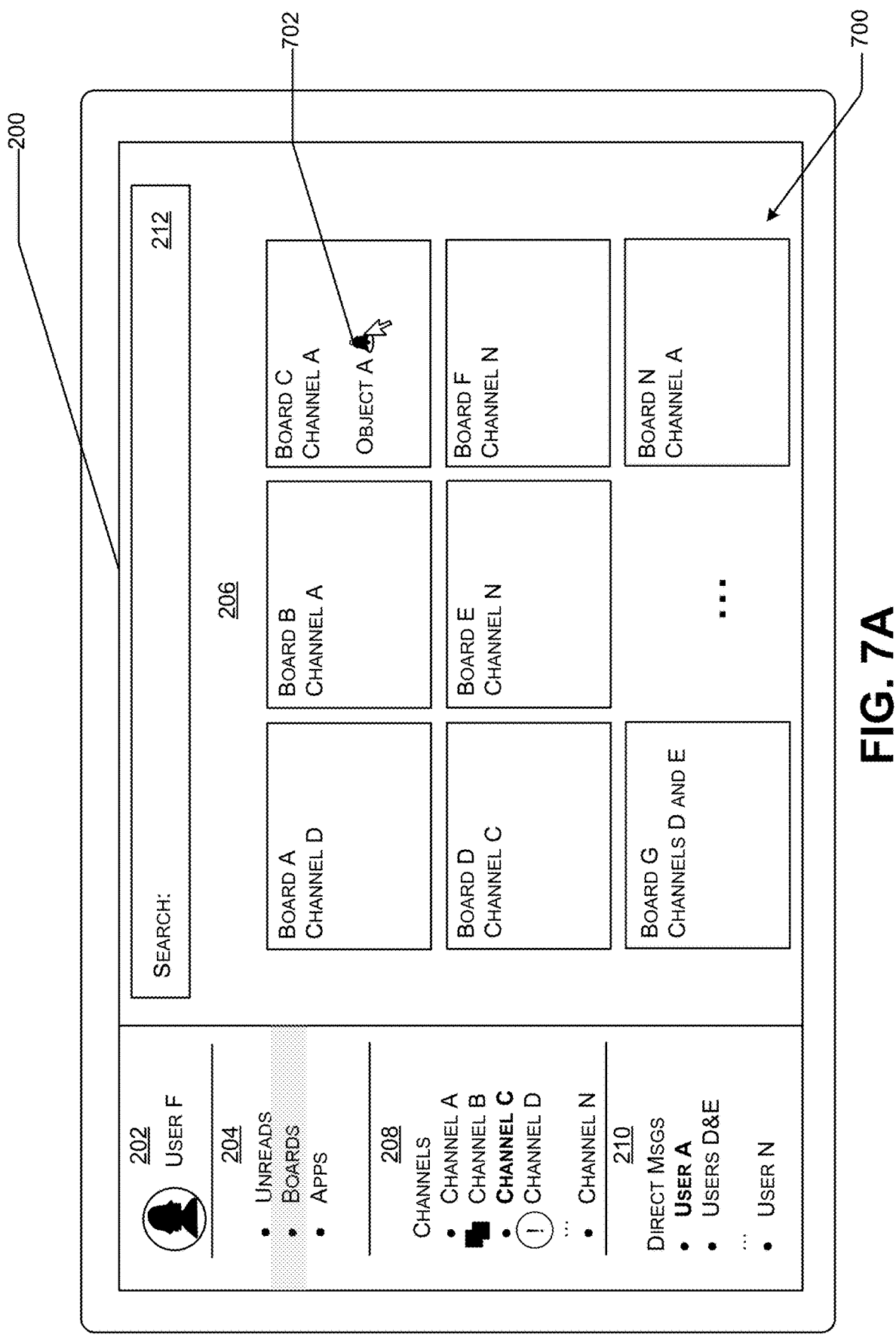
FIGS. 7A-7C illustrate another example of a user interface presented via a communication platform, as described herein.
Figure 7B:
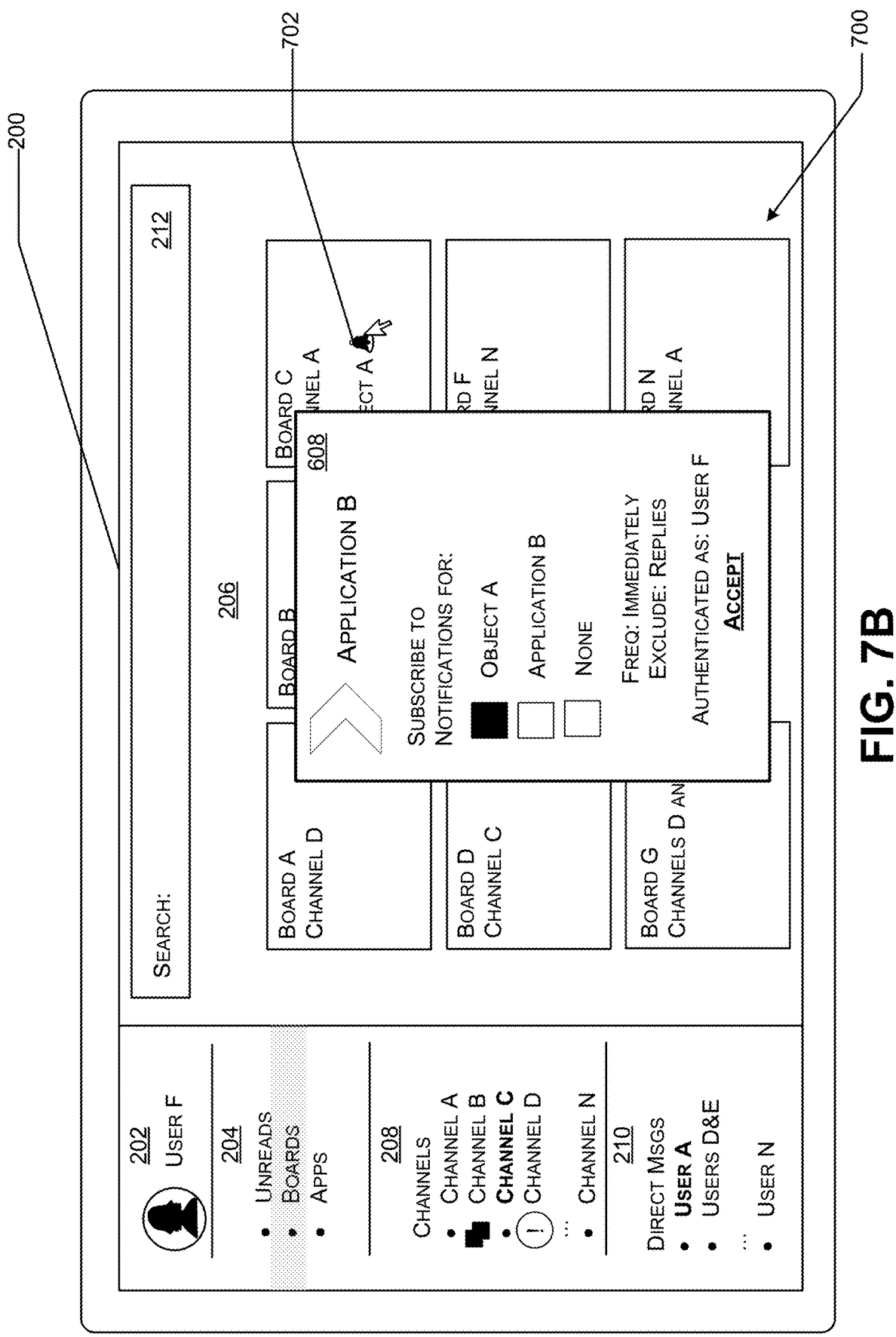
Figure 7C:
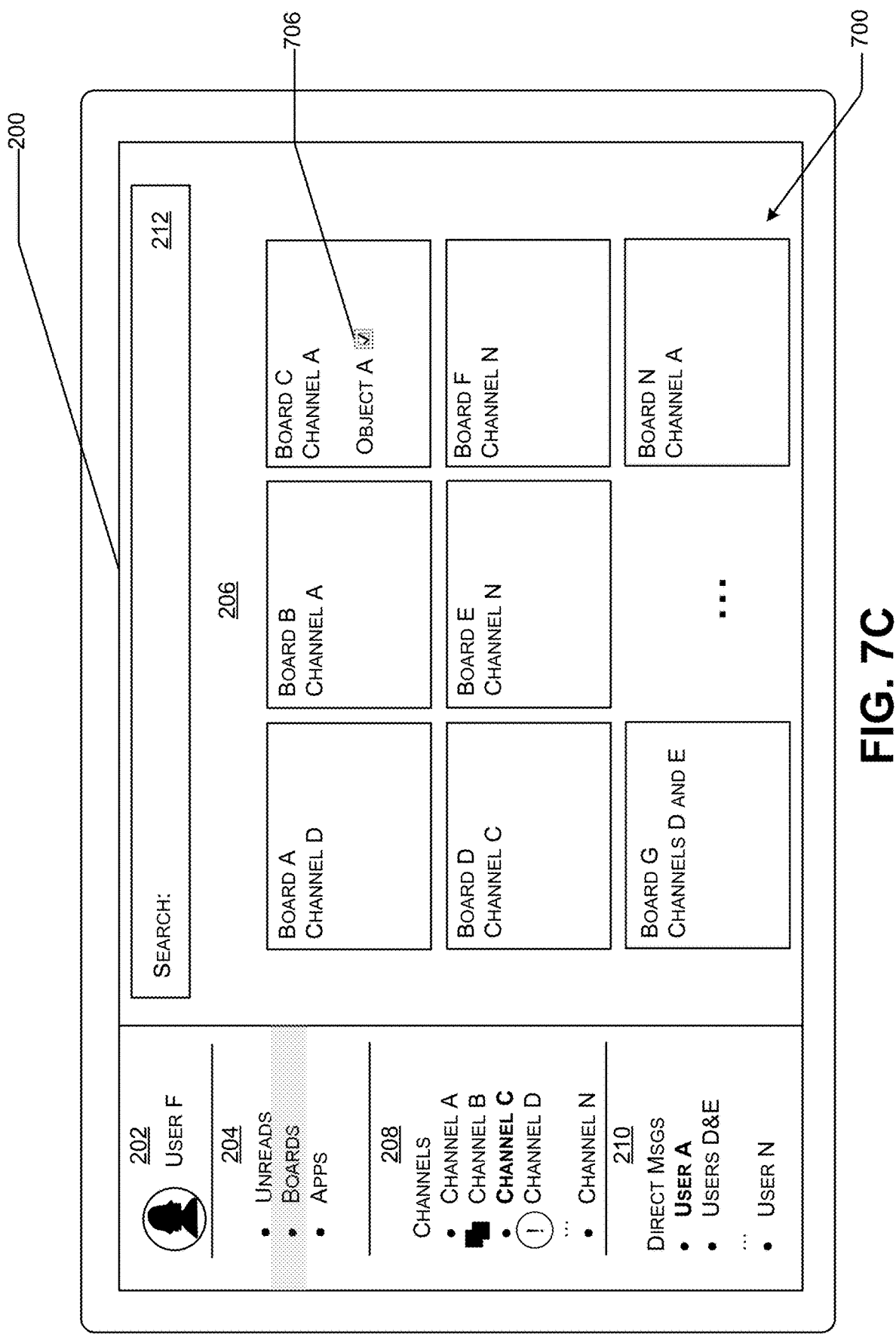

FIG. 7A illustrates an example where the user interface 200 is presenting one or more boards. As illustrated in FIG. 7A, the second section 206 comprises user interface elements 700 representing multiple boards. In at least one example, an interaction with one of the user interface elements 700 can cause the corresponding board to be presented via the user interface 200 (e.g., in the second section 206, for example). In at least one example, objects associated with boards can be configured for subscriptions via techniques similar to those described above. For example Board C is associated with Object A. Object A is associated with a user interface element 702 that indicates that the object is associated with an available subscription. In at least one example, the user interface element 702 can be associated with an actuation mechanism. In at least one example, based at least in part on detecting an interaction with the user interface element 702 (e.g., actuation of the actuation mechanism associated therewith), a subscription user interface 704 can be presented via the user interface 200, as illustrated in FIG. 7B. The subscription user interface 704 can include the same information as the subscription user interface 400 described above with reference to FIG. 4B. In at least one example, based at least in part on authorizing a subscription, the user interface 200 can be updated to include a user interface element 706 indicating that the associated object (e.g., Object A) is associated with a subscription, as illustrated in FIG. 7C.

FIGS. 1-7C make reference to "user interface elements." A user interface element can be any element of the user interface that is representative of an object, message, virtual space, and/or the like. A user interface element can be a text element, a graphical element, a picture, a logo, a symbol, and/or the like. In at least one example, individual of the user interface elements can be associated with actuation mechanisms. Such actuation mechanisms can make the corresponding user interface elements selectable. That is, actuation of an actuation mechanism as described herein can, in some examples, indicate a selection of a corresponding user interface element. In at least one example, the application 140 can receive an indication of an interaction with a user interface element (e.g., indication of a selection and/or actuation of an actuation mechanism) and can send an indication of such to the server(s) 102. In some examples, the server(s) 102 can send data and/or instructions to the application 140 to generate new user interfaces and/or update the user interface 200, as described herein.

The user interface 200 and variations described above are provided as a non-limiting example. Additional or alternative data can be presented via the user interface 200 and/or additional or alternative configurations of the data presented via the user interface 200 are within the scope of this disclosure.

FIGS. 8-11 are flowcharts showing example processes involving techniques as described herein. The processes illustrated in FIGS. 8-11 are described with reference to components described above with reference to the environment 100 shown in FIG. 1 and/or the user interface 200 described in FIGS. 2-7C for convenience and ease of understanding. However, the processes illustrated in FIGS. 8-11 are not limited to being performed using the components described above with reference to the environment 100 and/or the user interface 200. Moreover, the components described above with reference to the environment 100 and/or the user interface 200 are not limited to aspects described with respect to the processes illustrated in FIGS. 8-11.

The processes in FIGS. 8-11 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 8-11 can be combined in whole or in part with each other or with other processes.

Figure 8:
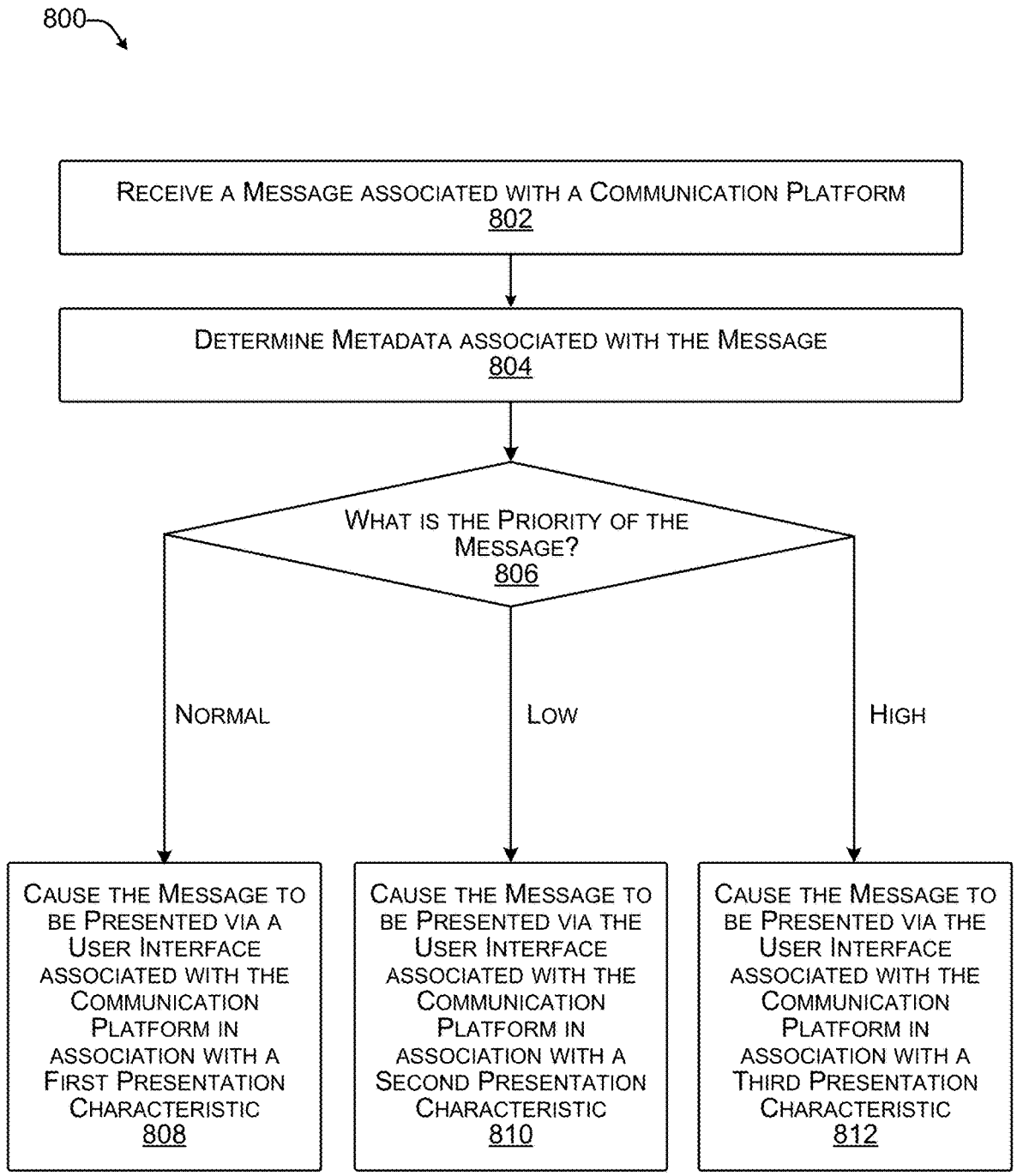
FIG. 8 illustrates an example process for presenting messages via a user interface based at least in part on a priority associated therewith, as described herein.

FIG. 8 illustrates an example process 800 for presenting messages via a user interface based at least in part on a priority associated therewith, as described herein. Differentiated presentation of messages on the user interface 200, based at least in part on metadata associated with such messages, can minimize distractions and bring clarity to users with respect to what needs focus. As described below, by using metadata, like priority, to emphasize critical and/or important messages, the communication platform can help users focus on the most important things and/or otherwise prioritize their interactions with the communication platform.

At operation 802, a component of the server(s) 102 (e.g., the channel management component 118, the direct message management component 120, etc.) can receive a message associated with a communication platform. In at least one example, users of the communication platform can exchange messages via one or more communication channels, direct messages, and/or the like. In some examples, a first user (e.g., an originating or sending user) can send a message to a second user (e.g., a receiving user). That is, a user computing device of the first user can send a message to a user computing device of the second user via the server(s) 102. In some examples, as described above, applications and/or other functional components can post messages and/or otherwise input data as messages to the communication platform. For example, when an event occurs (e.g., in an application and/or other functional component), a message associated with the event can be received. Examples of such an event include a comment added to a document, a report of a failure to merge, an announcement that a guest has arrived, a submission of an expense report, etc.

At operation 804, the component of the server(s) 102 can determine metadata associated with the message. As described above, individual messages (from users, applications, and/or the like) can be associated with metadata. Such metadata can include identifier(s), an originating source (e.g., which user and/or application a message originated and/or was sent from), a date the message was sent, a timestamp associated with when the message was sent, a priority (e.g., low, normal, high, etc.) associated with the message, an expiration date associated with the message, an open/closed status associated with the message, a label associated with the message, an assignee associated with the message, etc.

In at least one example, such metadata can be appended to the individual messages when they are received by the server(s) 102. That is, in such an example, an originating source can generate and/or associate metadata with a message prior to sending it to the server(s) 102. In at least one example, metadata can be generated by the server(s) 102 and associated with the message by the server(s) 102. For example, the component of the server(s) 102 can analyze content of a received message (for example, using natural language processing, image recognition, etc.) and/or metadata associated with the received message at the time of receipt, etc. to determine additional metadata associated with the message using rule(s), indicator(s) associated with received messages, and/or machine-trained model(s). In some examples, metadata associated with a message can be generated in part by the originating source and in part by the server(s) 102.

In some examples, the metadata can be used for determining how to present a message in the user interface 200. For example, metadata can cause messages to be presented with different presentation characteristics (e.g., size, font, color, animation, in a message digest (or not), etc.). In some examples, metadata associated with a message can be used for annotating the user interface 200, searching, filtering, and/or triggering workflows. In some examples, metadata associated with messages can trigger functions, as described above, and/or be used for managing data loss protection.

At operation 806, the component of the server(s) 102 can determine the priority of the message. In some examples, the metadata can be used to determine priorities associated with individual messages. In some examples, the priority of the message can be designated by an originating user (e.g., the user can designate a message as "high priority," "urgent," or the like) and the component of the server(s) 102 can determine the priority of the message based on such a designation. In some examples, the priority of the message can be determined by a functional component of the sending user computing device (e.g., based on rule(s) and/or machine-trained model(s) associated therewith) and the component of the server(s) 102 can determine the priority of the message based on an indication associated with the message (e.g., metadata associated therewith) when received.

In some examples, the component of the server(s) 102 can analyze metadata associated with a message to determine a priority of the message. For instance, in some examples, a received message can include metadata indicating an originating source, a date the message was sent, and a timestamp associated with then the message was sent. In some examples, the component of the server(s) 102 can utilize such metadata and/or content associated therewith to determine a priority associated with the received message. In some examples, the component of the server(s) 102 can utilize hard-coded rules provided by developers, an indicator that can be selected by an originating user (and associated with the received message), and/or machine-trained model(s) to determine the priority. In some examples, priorities can be determined based at least in part on an originating source (e.g., which user and/or application sent the message), a date of a message, a time of a message, a type of the message, content of a message, a topic of a message, and/or the like. In an example where the component of the server(s) 102 determines the priority of the message, the component of the server(s) 102 can associate the priority with the metadata of the message.

In some examples, different priorities can cause messages to be presented with different presentation characteristics, in an effort to enable users to easily consume data presented via the user interface 200.

Based at least in part on determining that the message is associated with a normal priority, the component of the server(s) 102 can cause the message to be presented via a user interface associated with the communication platform in association with a first presentation characteristic, as illustrated at operation 808. In some examples, messages that are not associated with a high priority or a low priority, that is, "normal priority" messages, can be represented by user interface elements that are associated with a particular size, color, font, animation, etc. Such presentation can be a "default" presentation or a "standard" presentation. In some examples, based at least in part on determining that the message is a normal priority message, the component of the server(s) 102 can send an instruction to the application 140 to present the user interface element associated with the normal priority message in association with the first presentation characteristic. In some examples, the application 140 can receive a message associated with metadata indicating that it is a normal priority message and can render the user interface element associated therewith based at least in part on the first presentation characteristic. An example of a user interface element associated with a normal priority message is illustrated above with reference to FIG. 2.

Based at least in part on determining that the message is associated with a low priority, the component of the server(s) 102 can cause the message to be presented via a user interface associated with the communication platform in association with a second presentation characteristic, as illustrated at operation 810. Low priority messages can be associated with particular users or applications, may not require or expect an action, may not be associated with an expiration time, etc. In some examples, user interface elements associated with low priority messages can be presented in a different size, different color, different font, different animation, and/or the like, for example, relative to "normal priority" messages and/or "high priority" messages. That is, in at least one example, based at least in part on determining that the message is a low priority message, the component of the server(s) 102 can send instruction to the application 140 to present the user interface element associated with the low priority message in association with the second presentation characteristic. In some examples, the application 140 can receive a message associated with metadata indicating that it is a low priority message and can render the user interface element associated therewith based at least in part on the second presentation characteristic. An example of a user interface element associated with a low priority message is illustrated above with reference to FIG. 2. In some examples, by deemphasizing low priority messages, high priority messages (e.g., important messages from users and/or applications) can stand out on the user interface 200.

Based at least in part on determining that the message is associated with a high priority, the component of the server(s) 102 can cause the message to be presented via a user interface associated with the communication platform in association with a third presentation characteristic, as illustrated at operation 812. High priority messages can be associated with particular users or applications, may require or expect an action, may be associated with an expiration time, etc. In some examples, user interface elements associated with high priority messages can be presented in a different size, different color, different font, different animation, and/or the like, for example, relative to "normal priority" messages and/or "low priority" messages. That is, in at least one example, based at least in part on determining that the message is a high priority message, the component of the server(s) 102 can send instruction to the application 140 to present the user interface element associated with the high priority message in association with the third presentation characteristic. In some examples, the application 140 can receive a message associated with metadata indicating that it is a high priority message and can render the user interface element associated therewith based at least in part on the third presentation characteristic. An example of a user interface element associated with a high priority message is illustrated above with reference to FIG. 2. In some examples, by emphasizing high priority messages such messages can stand out on the user interface 200.

As described above, in some examples, high priority messages can cause a user interface element to be presented in association with the communication channel, direct message, and/or the like with which they are associated, for example, to alert a user that there is a high priority message associated therewith. In some examples, high priority messages can cause notification settings to be overridden (e.g., pass through a "do not disturb" or "notifications off" setting), cause subsequent messages and/or alerts to be presented via the user interface 200 until the high priority message is read, and/or the like.

While three priorities are described above, messages can be associated with any number of different priorities, which can be set by a developer and/or learned by machine learning mechanisms. In some examples, each priority can be associated with different presentation characteristic(s) to enable a user to quickly differentiate between priorities of messages on the user interface 200. As described above, priorities can mean different things to different users. In some examples, priorities can affect presentation characteristics differently for different users. For instance, a customer service ticket associated with a code glitch can be of high priority to a developer but may be of low priority to a designer. As such, in some examples, the component of the server(s) 102 can modify priorities and/or presentation characteristics based at least in part on user data associated with recipient user(s).

Figure 9:
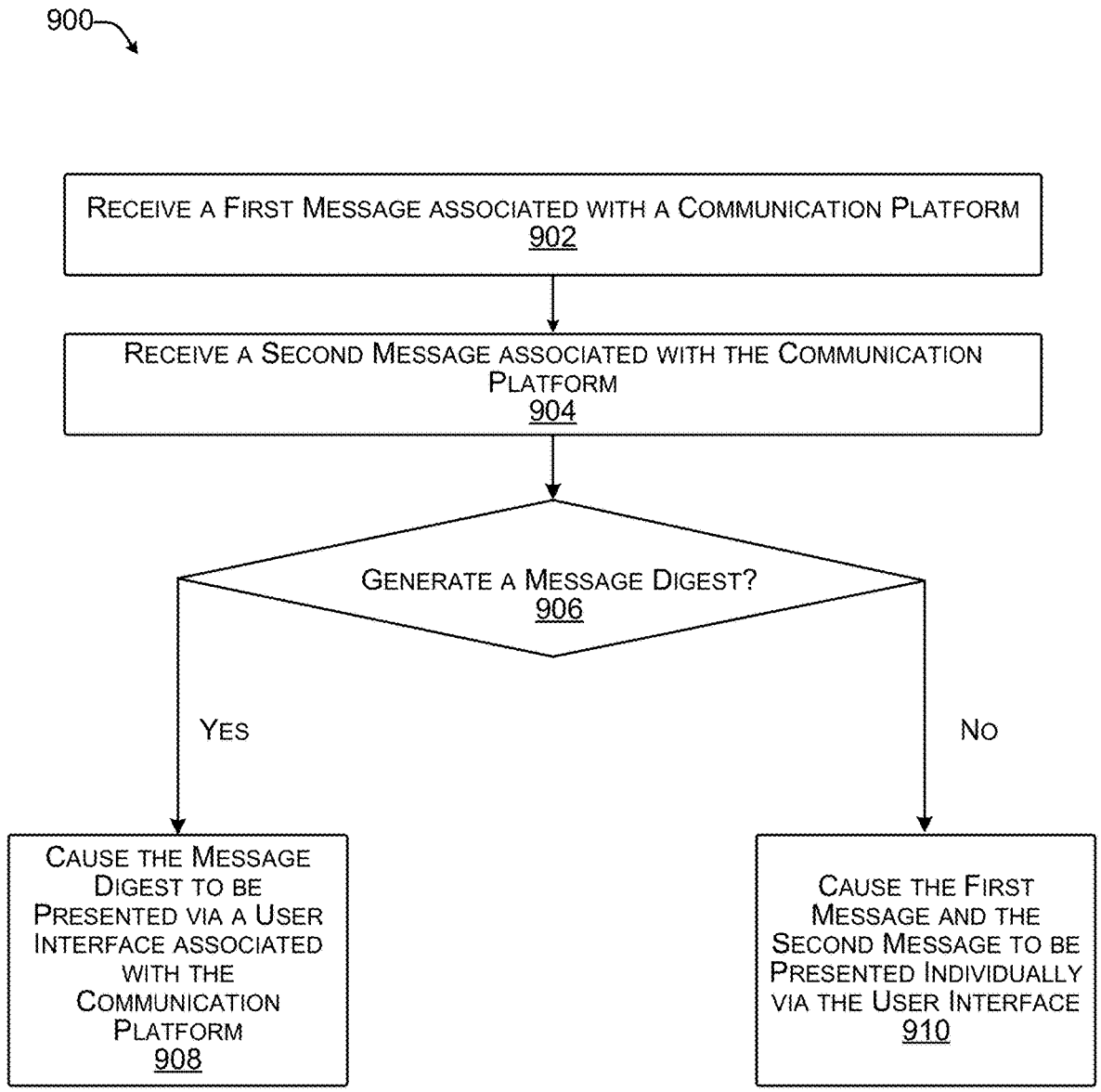
FIG. 9 illustrates an example process for generating a message digest, as described herein.

FIG. 9 illustrates an example process 900 for generating a message digest, as described herein. Message digests can reduce clutter or "noise" associated with resources of the communication platform, such as communication channels or direct messages.

At operation 902, a component of the server(s) 102 (e.g., the channel management component 118, the direct message management component 120, etc.) can receive a first message associated with a communication platform. As described above with respect to operation 802, the first message can be received by the server(s) 102 from an originating source (e.g., a user computing device, an application, etc.). In some examples, the first message can be associated with first metadata, as described above.

At operation 904, the component of the server(s) 102 can receive a second message associated with the communication platform. As described above with respect to operation 802, the second message can be received by the server(s) 102 from an originating source (e.g., a user computing device, an application, etc.). In some examples, the second message can be associated with second metadata, as described above.

At operation 906, the component of the server(s) 102 can determine whether to generate a message digest. In at least one example, the component of the server(s) 102 can analyze metadata associated with the first message and the second message to determine whether to generate a message digest (e.g., instead of presenting the messages individually via the user interface 200). In at least one example, based at least in part on determining that first and second messages are associated with a same originating source (e.g., same user and/or same application), a same priority, and/or the like, the component of the server(s) 102 can determine to generate a message digest associated with the first and second messages. In some examples, the component of the server(s) 102 can determine whether the first and second messages are associated with timestamps within a period of time and, based on a determination that the first and second messages are associated with timestamps within the period of time, can determine to generate a message digest. In some examples, the component of the server(s) 102 can determine whether the first and second messages are associated with a same date or date range and, based on a determination that the first and second messages are associated with a same date or date range, the component of the server(s) 102 can determine to generate a message digest. In some examples, the originating source, priority, date (date range), and time (period of time) may need to be the same for the component of the server(s) 102 to determine to generate a message digest. In some examples, if any one or more of the aforementioned characteristics is the same, the component of the server(s) 102 can determine to generate a message digest.

In some examples, other characteristics of a message can be associated with a rule indicating that messages associated with such characteristics should be excluded from a message digest. For example, in some examples, if the first message or the second message is associated with an action item, the component of the server(s) 102 can refrain from generating a message digest and/or can refrain from adding that message to the message digest. In some examples, if the first message or the second message is associated with a high priority, the component of the server(s) 102 can refrain from generating a message digest and/or can refrain from adding that message to the message digest.

At operation 908, the component of the server(s) 102 can cause the message digest to be presented via a user interface associated with the communication platform. In at least one example, based at least in part on the generation of the message digest, the component of the server(s) 102 can send an instruction to the application 140 to present the message digest. In at least one example, the application 140 can render a user interface element representative of the message digest via the user interface 200. In some examples, the user interface element can be associated with an indication of the originating source (e.g., user and/or application) and, in some examples, a number of messages in the message digest (e.g., three messages). In some examples, the user interface element can include a date and/or date range, a timestamp and/or period of time, and/or the like. An example of a user interface element representative of a message digest is described above with reference to FIG. 3A. In at least one example, the user interface element can be associated with an actuation mechanism. In at least one example, based at least in part on actuating the actuation mechanism, the messages can be presented via the user interface 200. That is, the component of the server(s) 102 can receive an indication of an actuation of the actuation mechanism (e.g., from the application 140) and can cause the user interface 200 to present the individual messages associated with the message digest. Additional details associated with presenting the individual messages are provided above with reference to FIG. 3B.

In some examples, a user can filter messages associated with the message digest. For example, the message digest can comprise a plurality of messages, including the first message and the second message, and the user can filter the plurality of messages to include messages associated with a particular characteristic (e.g., user, application, priority, time, date, type, topic, etc.). That is, when a user requests to view messages associated with the message digest, the user can specify characteristic(s) of messages that they desire to include or exclude in the individual messages that are presented. In at least one example, metadata associated with such messages can be used by the component of the server(s) 102 to determine which messages to include or exclude in presenting the individual messages associated with the message digest.

At operation 910, the component of the server(s) 102 can cause the first message and the second message to be presented individually via the user interface. In at least one example, if the component of the server(s) 102 decides not to generate a message digest (e.g., the first and second message were not associated with the same originating source, priority, date (date range), time (period of time), and/or the like, and/or the first message or the second message was associated with a characteristic indicating that it should not be added to a message digest), the component of the server(s) 102 can cause the first message and the second message to be presented individually via the user interface 200. In such an example, the first message and the second message can be presented via a communication channel, direct message, and/or the like based on date, time, originating source, topic, and/or the like, as described above.

FIGS. 8 and 9 relate to processes for presenting messages via the user interface 200 and/or generating message digests for presentation via the user interface 200. Techniques described herein can be used for any type of content associated with the communication platform that is associated with metadata. For instance, techniques described herein can be used for differentiating presentation of snippets of content and/or generating digests associated therewith.

Figure 10:
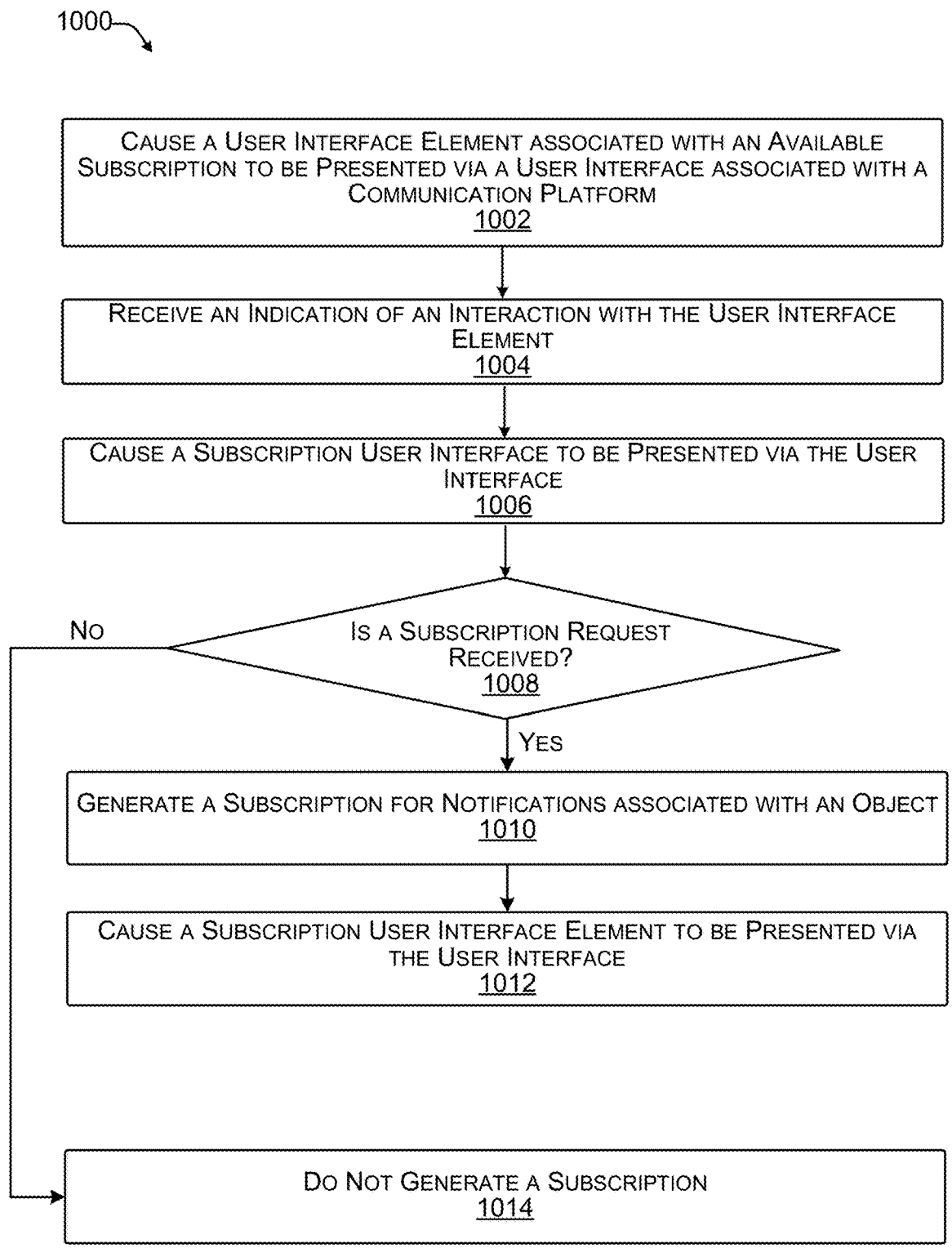
FIG. 10 illustrates an example process for generating a subscription, as described herein.
Figure 11:
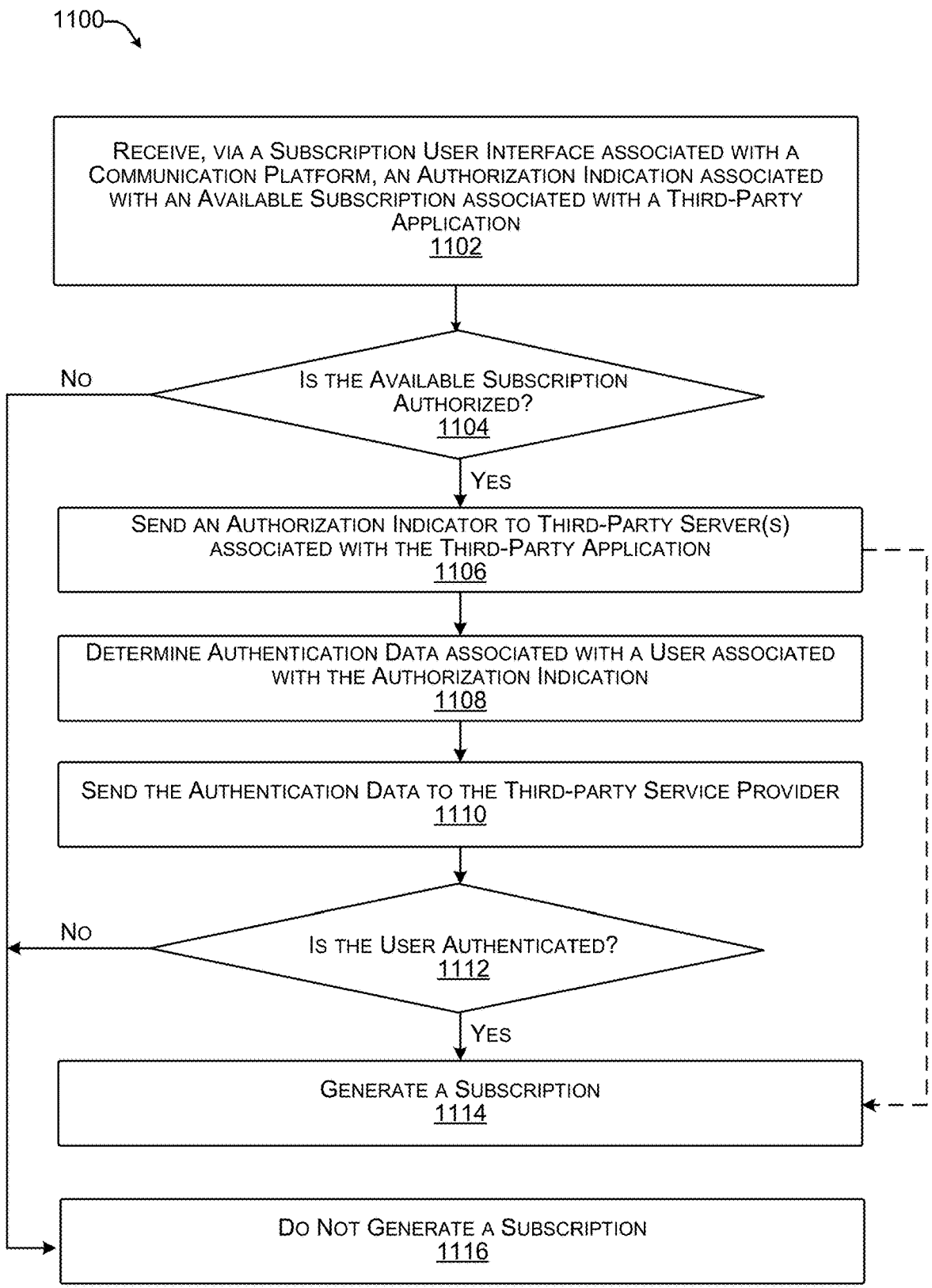
FIG. 11 illustrates additional details associated with generating a subscription, as described herein.

As described herein, a subscription can be a source of notifications from an application. As described herein, a subscription can be associated with an object that is associated with an application. In some examples, a user can subscribe to notifications associated with an object and/or application. In some examples, a user can subscribe a group (e.g., an organization, a workspace, etc.), a communication channel, a direct message, a board, and/or the like to notifications associated with an object and/or the like. FIGS. 10 and 11 relate to processes associated with generating a subscription.

FIG. 10 illustrates an example process 1000 for generating a subscription, as described herein.

At operation 1002, the subscription management component 116 can cause a user interface element associated with an available subscription to be presented via a user interface associated with a communication platform. In at least one example, the user interface 200 can include one or more user interface elements to enable subscriptions to be generated and/or otherwise configured. In at least one example, a user interface element can be presented proximate to an object for which a subscription is available, as illustrated and described above with reference to FIG. 4A. In some examples, the user interface element can be presented in association with user interface element(s) representative of existing subscription(s), as illustrated and described above with reference to FIG. 5A. In some examples, the user interface element can be presented via a portion of the user interface 200 associated with one or more applications integrated with the communication platform, etc., as illustrated and described above with reference to FIG. 6A. In at least one example, the user interface element can be associated with an actuation mechanism that when actuated can cause a subscription user interface to be presented via the user interface 200.

At operation 1004, the subscription management component 116 can receive an indication of an interaction with the user interface element. In some examples, the user interface element can be associated with an actuation mechanism and the application 140 can detect an interaction therewith (e.g., actuation thereof). In at least one example, the application 140 can send an indication of the interaction with the user interface element to the server(s) 102. In at least one example, the subscription management component 116 can receive an indication associated with actuation of the actuation mechanism.

At operation 1006, the subscription management component 116 can cause a subscription user interface to be presented via the user interface. In at least one example, based at least in part on receiving an indication of an interaction with the user interface element, the subscription management component 116 can cause a subscription user interface to be presented via the user interface 200. In at least one example, the subscription user interface can be presented via an embedded browser, a modal window, a pop-up, an overlay, a section of the user interface 200, or a new user interface. The subscription user interface presented can be associated with different data and/or configurations, based at least in part on the context of the user interface element. For example, if the user interface element indicative of an available subscription is proximate to an object, the subscription user interface can present subscription options associated with that object, as illustrated and described above with reference to FIG. 4B. However, if the user interface element indicative of the available subscription is not proximate an object and/or otherwise associated with context indicating what object and/or application the available subscription is associated with, the subscription user interface can provide an input mechanism for a user to designate or select an object and/or application with which to associate the subscription, as illustrated and described above with reference to FIG. 5B.

In at least one example, the subscription user interface can include an indication of the platform associated with the available subscription, an object associated with the available subscription, and options associated with the available subscription (e.g., features thereof). In some examples, the subscription user interface can include input mechanisms to enable the user to designate an object and/or application with which to associate the subscription. In some examples, the subscription user interface can include an input mechanism to enable the user to designate preferences associated with the subscription (e.g., frequency of notifications, types of notifications to include or exclude, etc.). In some examples, the subscription user interface can include authentication data (e.g., which can be determined based at least in part on user data associated with the user) and/or an input mechanism for a user to input authentication data. In some examples, the subscription user interface can include an authorization user interface element, which can enable the user to provide authorization for the subscription (e.g., an authorization indication). In at least one example, such an authorization user interface element can be a control or other selectable element that can be associated with an actuation mechanism. Actuation of the actuation mechanism can be detected by the application 140 and can cause an indication of authorization to be sent from the application 140 to the server(s) 102. In at least one example, such an indication of authorization can be associated with a subscription request (e.g., a request to authorize a subscription).

At operation 1008, the subscription management component 116 can determine whether a subscription request is received. In at least one example, the subscription management component 116 can receive indications of authorization and/or subscription requests. In at least one example, based at least in part on receiving the subscription request associated with the available subscription, the subscription management component 116 can generate a subscription for notifications associated with the object and/or application with which the subscription request and/or authorization indication is associated, as illustrated at operation 1010. In some examples, a subscription can be specific to a particular user. In some examples, a subscription can be particular to a group, such as an organization or a workspace. In some examples, a subscription can be specific to a resource, such as a communication channel, direct message, board, etc. In at least one example, the subscription management component 116 can associate an indication of the subscription, in the datastore 122 for instance, with the object and/or application, the user associated with the subscription (e.g., user profile), a group associated with the subscription, a communication channel associated with the subscription, a direct message associated with the subscription, a board associated with the subscription, and/or the like. That is, a subscription can be generated based at least in part on associating an indication of the subscription with an indication of the object and/or application, a user profile, a group, a communication channel associated with the subscription, a direct message associated with the subscription, a board associated with the subscription, or the like. As such, when a notification is received from the application (e.g., the third-party server(s) 154 associated therewith), the subscription management component 116 can route the notification to the appropriate end user(s) and/or resource(s) (e.g., communication channel, direct message, board, etc.).

In at least one example, if the subscription is associated with a third-party platform, an authorization and/or authentication process can be implemented, as described below with reference to FIG. 11.

In some examples, users can configure subscriptions. For example, users can designate a frequency at which notifications are received, a time notifications are to be received, types of notifications to be received (or not), topics of notifications to be received, and/or the like. In some examples, users can designate priorities, as described above, and/or the like. In some examples, metadata associated with notifications can be used by the subscription management component 116 to determine when to post notifications, which notifications to post, presentation characteristics associated therewith, etc. In some examples, metadata associated with notifications can be used for creating workflows and/or triggering other functions. In some examples, subscription notifications can be searchable using metadata associated with such notifications.

At operation 1012, the subscription management component 116 can cause a subscription user interface element to be presented via the user interface. In at least one example, based at least in part on the subscription being generated, an indication of the subscription can be presented via the user interface 200. In some examples, a subscription user interface element associated with the subscription can be presented proximate to other user interface element(s) of other existing subscription(s), as illustrated in FIGS. 4C and 5C. In some examples, a subscription user interface element can be presented proximate to an object with which the subscription is associated. In some examples, where the subscription is associated with a communication channel, direct message, board, or other resource, a message can be posted in the communication channel, direct message, board, or other resource indicating that the resource has been subscribed to the object and/or application.

As described above, in at least one example, the subscription user interface element can be associated with an actuation mechanism. In at least one example, based at least in part on detecting an actuation of the actuation mechanism, the application 140 can send an indication of such to the server(s) 102. The subscription management component 116 can receive an indication of such an actuation and can cause a summary user interface to be presented via the user interface 200. In some examples, the summary user interface 404 can be presented as a pop-up (as shown), an overlay, a new section of the user interface, a new user interface, etc. In some examples, the summary user interface can present a summary of notifications associated with the subscription to which the actuated actuation mechanism/user interface element corresponds. In some examples, the summary of notifications can include all notifications since a previous summary was requested, all unread notifications, all notifications associated with the subscription, a subset of notifications associated with the subscription, etc. In some examples, the notifications can be organized based on date, time, topic, priority, last interaction, etc. An example of such a summary user interface is illustrated and described above with reference to FIG. 4D (e.g., for notifications associated with the "Notes" object of Application A).

In some examples, the summary user interface can include one or more additional user interface elements to enable termination of the subscription (e.g., "Cancel") or modification of the subscription (e.g., "Modify"). In some examples, based at least in part on detecting an interaction with the user interface element associated with the modification mechanism, a settings user interface can be presented to enable the user to provide preferences and/or otherwise modify features of the subscription. Input to the summary user interface can be provided to the subscription management component 116 (e.g., via the application 140) and the subscription management component 116 can terminate or modify the subscription based thereon.

At operation 1014, the subscription management component 116 can refrain from generating a subscription. In an example where a subscription request is not received, the subscription management component 116 can refrain from generating a subscription.

FIG. 11 illustrates additional details associated with generating a subscription, as described herein.

At operation 1102 of process 1100, the subscription management component 116 can receive, via a subscription user interface associated with a communication platform, an authorization indication associated with an available subscription associated with a third-party application. As described above with reference to operation 1006 of FIG. 10, in at least one example, based at least in part on receiving an indication of an interaction with a user interface element associated with an available subscription, the subscription management component 116 can cause a subscription user interface to be presented via the user interface 200. In some examples, the subscription user interface can include an authorization user interface element, which can enable the user to provide authorization for the subscription. In at least one example, such an authorization user interface element can be a control or other selectable element that can be associated with an actuation mechanism. Actuation of the actuation mechanism can be detected by the application 140 and can cause an indication of authorization to be sent from the application 140 to the server(s) 102.

At operation 1104, the subscription management component 116 can determine whether the available subscription is authorized. The subscription management component 116 can receive indications of interactions with subscription user interfaces. In at least one example, based at least in part on receiving an authorization indication, the subscription management component 116 can determine that the available subscription is authorized.

At operation 1106, the subscription management component 116 can send an authorization indicator to third-party server(s) 154 associated with the third-party application. In at least one example, based at least in part on receiving the authorization indication from the application 140, the subscription management component 116 can send an authorization indicator (e.g., an access token) to the third-party server(s) 154 (which can indicate that the user, group, communication channel, direct message, board, etc. is authorized to receive notifications associated with the object and/or third-party platform). In some examples, the subscription management component 116 can send an indication of the object associated with the subscription, the user associated with the subscription, the group associated with the subscription, the communication channel associated with the subscription, the direct message associated with the subscription, the board associated with the subscription and/or the like to the third-party server(s) 154. In some examples, the subscription management component 116 can send an indication of the frequency at which notifications are to be received and/or other specified preferences to the third-party server(s) 154.

At operation 1108, the subscription management component 116 can determine authentication data associated with a user associated with the authorization indication. In some examples, authentication data can be required to authenticate the user and/or the user computing device requesting the subscription. In such examples, the subscription management component 116 can determine authentication data associated with the user. For example, the subscription management component 116 can access authentication data associated with the user that may be stored in the datastore 122. In some examples, the subscription management component 116 can prompt the user for authentication data, for example, via the subscription user interface or another input mechanism (e.g., a pop-up, text message, email, etc.). In some examples, the subscription management component 116 can send the authentication data to the third-party server(s) 154, as illustrated at operation 1110. In at least one example, the subscription management component 116 can request consent from the user prior to providing such authentication data to the third-party server(s) 154. In some examples, such consent can be implied. The third-party server(s) 154 can return an authentication indicator (e.g., a token), which can be stored by the server(s) 102 to indicate that the user is authenticated to receive notifications via the subscription. That is, operations 1108-1110 can enable the establishment of a verified connection between user accounts of the user on the communication platform and the third-party platform. In an example where a user does not have an account with the third-party platform, the authentication data can be used by the third-party platform to create an account for the user.

At operation 1112, the subscription management component 116 can determine whether the user is authenticated. In at least one example, the subscription management component 116 can determine whether an authentication indicator has been received from the third-party server(s) 154. Based at least in part on determining that the authentication indicator has been received by the server(s) 102, the subscription management component 116 can generate a subscription, as illustrated at operation 1114, and described above with reference to operation 1010 of FIG. 10. In some examples, if authentication is not required (e.g., for public data streams or the like), the process 1100 can proceed from operation 1006 to operation 1114 without performing operations 1008-1112.

At operation 1116, the subscription management component 116 can refrain from generating a subscription. In at least one example, if an authorization indication is not received and/or the user is not authenticated, the subscription management component 116 can refrain from generating the subscription.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

Example Clauses

A. A computer-implemented method comprising: receiving a first message associated with a group-based communication platform, wherein the first message is associated with first metadata; receiving a second message associated with the group-based communication platform, wherein the second message is associated with second metadata; causing, based at least in part on the first metadata and the second metadata, the first message and the second message to be presented in a message digest via a first portion of a user interface associated with the group-based communication platform, wherein the message digest is associated with an actuation mechanism; and in response to receiving an indication of an interaction with the actuation mechanism, causing the first message and the second message to be presented via a second portion of the user interface.

B. The computer-implemented method of paragraph A, wherein: the first metadata is associated with an indication that the first message is associated with a first priority and, wherein the first message is presented via the second portion of the user interface in association with a first presentation characteristic based on the first priority; and wherein the second metadata is associated with an indication that the second message is associated with a second priority and, wherein the second message is presented via the second portion of the user interface in association with a second presentation characteristic.

C. The computer-implemented method of paragraph B, wherein the first priority and the second priority are different priorities, and wherein the first presentation characteristic and the second presentation characteristic are different presentation characteristics.

D. The computer-implemented method of either paragraph B or C, further comprising: receiving a third message associated with the group-based communication platform, wherein the third message is associated with third metadata; and based at least in part on a determination, based on the third metadata, that the third message is associated with a third priority, causing the third message to be presented via the first portion of the user interface, wherein the third message is presented in association with a third presentation characteristic, corresponding to the third priority, that is different than at least one of the first presentation characteristic or the second presentation characteristic.

E. The computer-implemented method of any of paragraphs A-D, further comprising, based at least in part on the first metadata and the second metadata indicating that the first message and the second message are associated with a same priority, generating the message digest for presentation via the user interface.

F. The computer-implemented method of paragraph E, wherein: the first metadata is associated with at least one of a first originating source, a first date, or a first time; and the second metadata is associated with at least one of a second originating source, a second date, or a second time, wherein generating the message digest is further based at least in part on a determination that at least one of (i) the first originating source and the second originating source are a same originating source, (ii) the first date and the second date are a same date, or (iii) that the first time and the second time are within a period of time.

G. The computer-implemented method of any of paragraphs A-F, wherein the message digest comprises a plurality of messages, including the first message and the second message, and wherein the plurality of messages can be filtered based at least in part on a characteristic.

H. The computer-implemented method of any of paragraphs A-G, further comprising: determining, using a machine-trained model or a set of rules, a priority associated with the first message; and associating an indication of the priority with the first metadata.

I. The computer-implemented method of paragraph H, wherein the priority is determined based at least in part on an originating source, a type of message, a topic associated with the message, or content of the message.

J. A system comprising: one or more processors; and one or more non-transitory computer-readable media comprising instructions that, when executed by the one or more processors, cause the system to perform operations comprising: receiving a first message associated with a group-based communication platform, wherein the first message is associated with first metadata; receiving a second message associated with the group-based communication platform, wherein the second message is associated with second metadata; causing, based at least in part on the first metadata and the second metadata, the first message and the second message to be presented in a message digest via a first portion of a user interface associated with the group-based communication platform, wherein the message digest is associated with an actuation mechanism; and in response to receiving an indication of an interaction with the actuation mechanism, causing the first message and the second message to be presented via a second portion of the user interface.

K. The system of paragraph J, wherein: the first metadata is associated with an indication that the first message is associated with a first priority and, wherein the first message is presented via the second portion of the user interface in association with a first presentation characteristic based on the first priority; and wherein the second metadata is associated with an indication that the second message is associated with a second priority and, wherein the second message is presented via the second portion of the user interface in association with a second presentation characteristic.

L. The system of paragraph K, the operations further comprising: receiving a third message associated with the group-based communication platform, wherein the third message is associated with third metadata; and based at least in part on a determination, based on the third metadata, that the third message is associated with a third priority that is different than the first priority, causing the third message to be presented via the first portion of the user interface, wherein the third message is presented in association with a third presentation characteristic corresponding to the third priority.

M. The system of any of paragraphs J-L, the operations further comprising, based at least in part on the first metadata and the second metadata indicating that the first message and the second message are associated with a same priority, generating the message digest for presentation via the user interface.

N. The system of paragraph M, wherein: the first metadata is associated with at least one of a first originating source, a first date, or a first time; and the second metadata is associated with at least one of a second originating source, a second date, or a second time, wherein generating the message digest is further based at least in part on a determination that at least one of (i) the first originating source and the second originating source are a same originating source, (ii) the first date and the second date are a same date, or (iii) that the first time and the second time are within a period of time.

O. The system of any of paragraphs J-N, the operations further comprising: determining, using a machine-trained model or a set of rules, a priority associated with the first message, wherein the priority is determined based at least in part on an originating source, a type of message, a topic associated with the message, or content of the message; and associating an indication of the priority with the first metadata.

P. One or more non-transitory computer-readable media comprising instructions that, when executed by one or more processors, cause the one or more processors to perform operations comprising: receiving a first message associated with a group-based communication platform, wherein the first message is associated with first metadata; receiving a second message associated with the group-based communication platform, wherein the second message is associated with second metadata; causing, based at least in part on the first metadata and the second metadata, the first message and the second message to be presented in a message digest via a first portion of a user interface associated with the group-based communication platform, wherein the message digest is associated with an actuation mechanism; and in response to receiving an indication of an interaction with the actuation mechanism, causing the first message and the second message to be presented via a second portion of the user interface.

Q. The one or more non-transitory computer-readable media of paragraph P, wherein: the first metadata is associated with an indication that the first message is associated with a first priority and, wherein the first message is presented via the second portion of the user interface in association with a first presentation characteristic based on the first priority; and wherein the second metadata is associated with an indication that the second message is associated with a second priority, that is the same as the first priority, and, wherein the second message is presented via the second portion of the user interface in association with the first presentation characteristic.

R. The one or more non-transitory computer-readable media of paragraph Q, the operations further comprising: receiving a third message associated with the group-based communication platform, wherein the third message is associated with third metadata; and based at least in part on a determination, based on the third metadata, that the third message is associated with a third priority that is different than the first priority, causing the third message to be presented via the first portion of the user interface, wherein the third message is presented in association with a second presentation characteristic, corresponding to the third priority, that is different than the first presentation characteristic.

S. The one or more non-transitory computer-readable media of any of paragraphs P-R, the operations further comprising, based at least in part on the first metadata and the second metadata indicating that the first message and the second message are associated with a same priority, generating the message digest for presentation via the user interface.

T. The one or more non-transitory computer-readable media of any of paragraphs P-S, further comprising: determining, using a machine-trained model or a set of rules, a priority associated with the first message, wherein the priority is determined based at least in part on an originating source, a type of message, a topic associated with the message, or content of the message; and associating an indication of the priority with the first metadata.

U. A computer-implemented method comprising: causing display of a user interface element in a user interface of a group-based communication platform, presented via a user computing device, wherein the user interface element corresponds to an object associated with a third-party application; receiving an indication of an interaction with the user interface element; in response to receiving the indication of the interaction with the user interface element, causing a subscription user interface to be presented via the user interface, wherein the subscription user interface is associated with an option to subscribe to notifications associated with the object; in response to receiving a request to subscribe to notifications associated with the object, generating a subscription for notifications associated with the object, wherein the subscription causes notifications associated with the object to be presented via the user interface; and in response to generating the subscription, causing a subscription user interface element to be presented via the user interface, wherein the subscription user interface element indicates the object is associated with a subscription.

V. The computer-implemented method of paragraph U, further comprising associating an indication of the subscription with at least one of an indication of the object, a user profile, a group, a board, a communication channel, or a direct message.

W. The computer-implemented method of either paragraph U or V, further comprising: receiving an indication of an interaction with the subscription user interface element; and causing a summary of notifications associated with the object to be presented via the user interface.

X. The computer-implemented method of any of paragraphs U-V, wherein the subscription user interface element is presented in association with a communication channel or a direct message.

Y. The computer-implemented method of any of paragraphs U-X, wherein the subscription user interface element is presented in association with a portion of the user interface associated with one or more applications integrated with the group-based communication platform.

Z. The computer-implemented method of any of paragraphs U-Y, wherein the subscription user interface element includes a representation of the third-party application and a name of the object.

AA. The computer-implemented method of any of paragraphs U-Z, further comprising: receiving a request to specify features of the subscription; and in response to receiving the request to specify features of the subscription, causing a settings user interface to be presented via the user interface, wherein the settings user interface is associated with options for specifying features of the subscription.

AB. The computer-implemented method of any of paragraphs U-AA, wherein generating the subscription is based at least in part on at least one of (i) a determination that the subscription is authorized by a user of the user computing device or (ii) a determination that the user is authenticated by the third-party application.

AC. A system comprising: one or more processors; and one or more non-transitory computer-readable media comprising instructions that, when executed by the one or more processors, cause the system to perform operations comprising: causing display of a user interface element in a user interface of a group-based communication platform, presented via a user computing device, wherein the user interface element corresponds to an object associated with a third-party application; receiving an indication of an interaction with the user interface element; in response to receiving the indication of the interaction with the user interface element, causing a subscription user interface to be presented via the user interface, wherein the subscription user interface is associated with an option to subscribe to notifications associated with the object; in response to receiving a request to subscribe to notifications associated with the object, generating a subscription for notifications associated with the object, wherein the subscription causes notifications associated with the object to be presented via the user interface; and in response to generating the subscription, causing a subscription user interface element to be presented via the user interface, wherein the subscription user interface element indicates the object is associated with a subscription.

AD. The system of paragraph AC, the operations further comprising associating an indication of the subscription with at least one of an indication of the object, a user profile, a group, a board, a communication channel, or a direct message.

AE. The system of either paragraph AC or AD, the operations further comprising: receiving an indication of an interaction with the subscription user interface element; and causing a summary of notifications associated with the object to be presented via the user interface.

AF. The system of any of paragraphs AC-AE, wherein the subscription user interface element is presented in association with a communication channel or a direct message.

AG. The system of any of paragraphs AC-AF, wherein the subscription user interface element is presented in association with a portion of the user interface associated with one or more applications integrated with the group-based communication platform.

AH. The system of any of paragraphs AC-AG, wherein the subscription user interface element includes a representation of the third-party application and a name of the object.

AI. The system of any of paragraphs AC-AH, the operations further comprising: receiving a request to specify features of the subscription; and in response to receiving the request to specify features of the subscription, causing a settings user interface to be presented via the user interface, wherein the settings user interface is associated with options for specifying features of the subscription.

AJ. The system of any of paragraphs AC-AI, wherein generating the subscription is based at least in part on at least one of (i) a determination that the subscription is authorized by a user of the user computing device or (ii) a determination that the user is authenticated by the third-party application.

AK. One or more non-transitory computer-readable media comprising instructions that, when executed by one or more processors, cause the one or more processors to perform operations comprising: causing display of a user interface element in a user interface of a group-based communication platform, presented via a user computing device, wherein the user interface element corresponds to an object associated with a third-party application; receiving an indication of an interaction with the user interface element; in response to receiving the indication of the interaction with the user interface element, causing a subscription user interface to be presented via the user interface, wherein the subscription user interface is associated with an option to subscribe to notifications associated with the object; in response to receiving a request to subscribe to notifications associated with the object, generating a subscription for notifications associated with the object, wherein the subscription causes notifications associated with the object to be presented via the user interface; and in response to generating the subscription, causing a subscription user interface element to be presented via the user interface, wherein the subscription user interface element indicates the object is associated with a subscription.

AL. The one or more non-transitory computer-readable media of paragraph AK, the operations further comprising: receiving an indication of an interaction with the subscription user interface element; and causing a summary of notifications associated with the object to be presented via the user interface.

AM. The one or more non-transitory computer-readable media of paragraph AK or AL, wherein the subscription user interface element is presented in association with at least one of: a communication channel; a direct message; or a portion of the user interface associated with one or more applications integrated with the group-based communication platform.

AN. The one or more non-transitory computer-readable media of any of paragraphs AK-AM, wherein generating the subscription is based at least in part on at least one of (i) a determination that the subscription is authorized by a user of the user computing device or (ii) a determination that the user is authenticated by the third-party application.

AO. A computer-implemented method comprising: causing display of a user interface element in a user interface of a group-based communication platform, presented via a user computing device, wherein the user interface element corresponds to an object associated with a third-party application; in response to receiving an indication of an interaction with the user interface element, causing a subscription user interface to be presented via the user interface, wherein the subscription user interface includes an authorization user interface element for providing an authorization indication associated with an available subscription; receiving an indication of an interaction with the authorization user interface element; sending an authorization indicator to the third-party application; and based at least in part on sending the authorization indicator to the third-party application, generating a subscription for notifications associated with the third-party application, wherein the subscription causes notifications associated with the third-party application to be presented via the user interface.

AP. The computer-implemented method of paragraph AO, wherein the authorization indicator enables the notifications associated with the third-party application to be presented via the user interface for a period of time.

AQ. The computer-implemented method of either of paragraph AO or AP, wherein the authorization indicator enables the notifications associated with the third-party application to be presented via the user interface without authorizing additional features of the third-party application.

AR. The computer-implemented method of any of paragraphs AO-AQ, wherein the subscription user interface is presented via an embedded browser or a modal window.

AS. The computer-implemented method of any of paragraphs AO-AR, further comprising: sending authentication data associated with a user of the user computing device to the third-party application; and receiving an authentication indicator indicating that the user is authenticated from the third-party application, wherein generating the subscription is further based at least in part on receiving the authentication indicator.

AT. The computer-implemented method of any of paragraphs AO-AS, further comprising, based at least in part on generating the subscription, sending, to the third-party application, an indication of the subscription and at least one of a user identifier associated with a user of the user computing device, a group identifier associated with a user of the user computing device, a board identifier associated with a board with which the subscription is associated, a communication channel identifier with which the subscription is associated, or a direct message identifier with which the subscription is associated.

AU. The computer-implemented method of any of paragraphs AO-AT, wherein the user interface element is associated with an object associated with the third-party application, and wherein the subscription is for notifications associated with the object.

AV. The computer-implemented method of any of paragraphs AO-AU, wherein the user interface element is associated with a communication channel or a direct message.

AW. The computer-implemented method of paragraph AO, wherein the user interface element is associated with one or more indications of third-party applications integrated with the group-based communication platform.

AX. The computer-implemented method of any of paragraphs AO-AV, further comprising: receiving, from the third-party application, authorized features associated with the third-party application, without installing all features available via the third-party application; and causing the authorized features to be presented via the subscription user interface.

AY. The computer-implemented method of paragraph AX, further comprising accessing permission data associated with at least one of a user associated with the user computing device, a group with which the user is associated, a board, a communication channel, or a direct message, wherein causing the authorization features to be presented is based at least in part on the permission data.

While the paragraphs above are described with respect to one particular implementation, it should be understood that, in the context of this document, the content of the paragraphs above can also be implemented via a method, device, system, a computer-readable medium, and/or another implementation. Additionally, any of paragraphs A-AY may be implemented alone or in combination with any other one or more of the paragraphs A-AY.

What is claimed is:

1. A method comprising:
maintaining, by one or more servers of a group-based communication platform that facilitates communications between a plurality of users of the group-based communication platform, data indicating a plurality of third-party applications that are integrated within the group-based communication platform;
determining that a user of the plurality of users is subscribed to a third-party application of the plurality of third-party applications;
causing, based at least in part on the user being subscribed to the third-party application and without the third-party application being installed on or downloaded to a user computing device associated with the user, one or more notifications associated with the third-party application to be displayed via a user interface of the group-based communication platform that is presented via the user computing device; and
based at least in part on the third-party application not being installed on or downloaded to the user computing device:

providing, to the user, first access to a first subset of functionality of the third-party application; and restricting, to the user, second access to a second subset of functionality of the third-party application, wherein the first subset of functionality is a partial provisioning of features of the third-party application that differs from the second subset of functionality selected from a full provisioning of the features of the third-party application being installed on or downloaded to the user computing device;

wherein a frequency of notifications that are associated with the third-party application and that are provided to the user is based at least in part on the third-party application being installed on or downloaded to the user computing device.

2. The method as recited in claim 1, further comprising:
receiving, in association with the user, a request to install or download the third-party application to the user computing device or a different user computing device associated with the user; and
providing, to the user and based at least in part on the request, the second access to the second subset of functionality.

3. The method as recited in claim 1, wherein the communications between the plurality of users of the group-based communication platform occurs via communication channels authorized to be accessed by different sets of the plurality of users and that are presented via user computing devices associated with the plurality of users.

4. The method as recited in claim 1, further comprising:
causing display of a user interface element via the user interface presented via the user computing device, wherein the user interface element corresponds to an object associated with the third-party application;
receiving, in association with the user, an indication of an interaction with the user interface element; and
generating a subscription between the user and the third-party application based at least in part on the indication of the interaction with the user interface element.

5. The method as recited in claim 4, wherein the subscription causes notifications associated with the third-party application to be presented via the user interface, and further comprising associating, based at least in part on the indication of the interaction with the user interface element, the subscription with a user account of the user.

6. The method as recited in claim 4, further comprising:
causing, based at least in part on the indication of the interaction with the user interface element, display of a subscription user interface of the group-based communication platform via the user computing device; and
receiving, via the subscription user interface presented on the user computing device, authorization of the subscription.

7. The method as recited in claim 1, wherein causing the one or more notifications to be displayed via the user interface occurs without the third-party application being downloaded to a virtual space in which the user is a member.

8. The method as recited in claim 1, wherein determining that the user is subscribed to the third-party application comprises receiving, in association with the user, a request to subscribe to the third-party application via a subscription user interface of the group-based communication platform, wherein the subscription user interface includes input mechanisms to enable the user to designate a first option to subscribe to notifications associated with the third-party application and a second option to indicate a preference of the user regarding a type of the notifications, of multiple types of the notifications, to be received or excluded.

9. The method as recited in claim 1, wherein a type of the notifications that are to be provided to the user is based at least in part on the third-party application being installed on or downloaded to the user computing device.

10. A system comprising:
one or more processors;
memory; and
one or more computer-executable instructions stored in the memory and executable by the one or more processors to perform operations comprising:
maintaining, by one or more servers of a group-based communication platform that facilitates communications between a plurality of users of the group-based communication platform, data indicating a plurality of third-party applications that are integrated within the group-based communication platform;
determining that a user of the plurality of users is subscribed to a third-party application of the plurality of third-party applications;
causing, based at least in part on the user being subscribed to the third-party application and without the third-party application being installed on or downloaded to a user computing device associated with the user, one or more notifications associated with the third-party application to be displayed via a user interface of the group-based communication platform that is presented via the user computing device; and
based at least in part on the third-party application not being installed on or downloaded to the user computing device:
providing, to the user, first access to a first subset of functionality of the third-party application; and
restricting, to the user, second access to a second subset of functionality of the third-party application, wherein the first subset of functionality is a partial provisioning of features of the third-party application that differs from the second subset of functionality selected from a full provisioning of the features of the third-party application being installed on or downloaded to the user computing device;
wherein a frequency of notifications that are associated with the third-party application and that are provided to the user is based at least in part on the third-party application being installed on or downloaded to the user computing device.

11. The system as recited in claim 10, wherein the operations further comprise:
receiving, in association with the user, a request to install or download the third-party application to the user computing device or a different user computing device associated with the user; and
providing, to the user and based at least in part on the request, access to the second subset of functionality.

12. The system as recited in claim 10, wherein the communications between the plurality of users of the group-based communication platform occurs via communication channels authorized to be accessed by different sets of the plurality of users and that are presented via user computing devices associated with the plurality of users.

13. The system as recited in claim 10, wherein the operations further comprise:
causing display of a user interface element via the user interface presented via the user computing device, wherein the user interface element corresponds to an object associated with the third-party application;

receiving, in association with the user, an indication of an interaction with the user interface element; and generating a subscription between the user and the third-party application based at least in part on the indication of the interaction with the user interface element.

14. The system as recited in claim 13, wherein the subscription causes notifications associated with the third-party application to be presented via the user interface, and further comprising associating, based at least in part on the indication of the interaction with the user interface element, the subscription with a user account of the user.

15. The system as recited in claim 10, wherein a type of the notifications that are to be provided to the user is based at least in part on the third-party application being installed on or downloaded to the user computing device.

16. One or more non-transitory computer-readable media storing one or more computer-executable instructions that, when executed by one or more processors, cause the one or more processors to perform operations comprising:

maintaining, by one or more servers of a group-based communication platform that facilitates communications between a plurality of users of the group-based communication platform, data indicating a plurality of third-party applications that are integrated within the group-based communication platform;

determining that a user of the plurality of users is subscribed to a third-party application of the plurality of third-party applications;

causing, based at least in part on the user being subscribed to the third-party application and without the third-party application being installed on or downloaded to a user computing device associated with the user, one or more notifications associated with the third-party application to be displayed via a user interface of the group-based communication platform that is presented via the user computing device; and based at least in part on the third-party application not being installed on or downloaded to the user computing device:

providing, to the user, first access to a first subset of functionality of the third-party application; and restricting, to the user, second access to a second subset of functionality of the third-party application, wherein the first subset of functionality is a partial provisioning of features of the third-party application that differs from the second subset of functionality selected from a full provisioning of the features of the third-party application being installed on or downloaded to the user computing device;

wherein a frequency of notifications that are associated with the third-party application and that are provided to the user is based at least in part on the third-party application being installed on or downloaded to the user computing device.

17. The one or more non-transitory computer-readable media as recited in claim 16, wherein the operations further comprise:

causing display of a user interface element via the user interface presented via the user computing device, wherein the user interface element corresponds to an object associated with the third-party application;

receiving, in association with the user, an indication of an interaction with the user interface element; and generating a subscription between the user and the third-party application based at least in part on the indication of the interaction with the user interface element.

18. The one or more non-transitory computer-readable media as recited in claim 17, wherein the operations further comprise:

causing, based at least in part on the indication of the interaction with the user interface element, display of a subscription user interface of the group-based communication platform via the user computing device; and receiving, via the subscription user interface presented on the user computing device, authorization of the subscription.

19. The one or more non-transitory computer-readable media as recited in claim 16, wherein causing the one or more notifications to be displayed via the user interface occurs without the third-party application being downloaded to a virtual space in which the user is a member.

20. The one or more non-transitory computer-readable media as recited in claim 16, wherein determining that the user is subscribed to the third-party application comprises receiving, in association with the user, a request to subscribe to the third-party application via a subscription user interface of the group-based communication platform, wherein the subscription user interface includes input mechanisms to enable the user to designate a first option to subscribe to notifications associated with the third-party application and a second option to indicate a preference of the user regarding a type of the notifications, of multiple types of the notifications, to be received or excluded.

\* \* \* \* \*